(12) United States Patent
Kim et al.

(10) Patent No.: US 7,471,963 B2
(45) Date of Patent: Dec. 30, 2008

(54) MOBILE COMMUNICATION APPARATUS WITH MULTIPLE TRANSMISSION AND RECEPTION ANTENNAS AND MOBILE COMMUNICATION METHOD THEREFOR

(75) Inventors: Sung-jin Kim, Suwon (KR); Ho-jin Kim, Seoul (KR); Ju-ho Lee, Suwon (KR); Ki-ho Kim, Seoul (KR); Hyeon-woo Lee, Suwon (KR)

(73) Assignee: Samsung Electronics Co., Ltd. (KR)

( * ) Notice: Subject to any disclaimer, the term of this patent is extended or adjusted under 35 U.S.C. 154(b) by 1330 days.

(21) Appl. No.: 10/410,446

(22) Filed: Apr. 9, 2003

(65) Prior Publication Data
US 2003/0220103 A1 Nov. 27, 2003

(30) Foreign Application Priority Data
Apr. 9, 2002 (KR) .................. 10-2002-0019299

(51) Int. Cl.
*H04M 1/00* (2006.01)
*H04Q 7/20* (2006.01)
(52) U.S. Cl. .................. 455/562.1; 455/69; 370/334
(58) Field of Classification Search ............ 455/562.1, 455/69, 522; 370/334; 342/371–373
See application file for complete search history.

(56) References Cited

U.S. PATENT DOCUMENTS

| 7,050,776 B2 * | 5/2006 | Kim et al. ............. 455/277.1 |
| 2002/0009061 A1 | 1/2002 | Willenegger | |

FOREIGN PATENT DOCUMENTS

| EP | 0 905 920 A2 | 3/1999 |
| EP | 0 905 920 A3 | 8/1999 |

(Continued)

OTHER PUBLICATIONS

Siemens, Advanced closed loop Tx diversity concept (eigenbeamformer), Jul. 2000, 3GPP TSG RAN WG 1, pp. 1-12.*

(Continued)

*Primary Examiner*—Lee Nguyen
(74) *Attorney, Agent, or Firm*—The Farrell Law Firm, PC

(57) ABSTRACT

A mobile communication apparatus with multiple transmission and reception antennas and a mobile communication method therefor are provided. In the mobile communication apparatus including a base station and a mobile station, the base station with at least one transmission antenna restores long-term information, short-term information, a signal to interference and noise ratio (SINR) from a feedback signal received from the mobile station, spatially processes dedicated physical channel (DPCH) signals using basis information generated from the restored long-term information, short-term information, and SINR, and transmits the results of adding pilot channel (PICH) signals to the spatially processed results to the mobile station. The mobile station with at least one reception antenna determines a first characteristic corresponding to the channel downlink characteristic for each of the transmission and reception antennas, from the PICH signals transmitted from the base station, determines the long-term information, the short-term information, and downlink power control information including the SINR, which reflect the first characteristic, converts the determined long-term information, short-term information, and downlink power control information into the feedback signal, and transmits the feedback signal to the base station.

23 Claims, 19 Drawing Sheets

FOREIGN PATENT DOCUMENTS

JP          2003/234693          8/2003

OTHER PUBLICATIONS

Hemanth Sampath "Linear Precoding And Decoding For Multiple Input Multiple Output (MIMO) Wireless Channels", A Dissertation Submitted to the Dept. of Electrical Engineering & The Committee on Graduate studies of Stanford University, Apr. 2001.

Andrea J. Goldsmith and Soon-Ghee Chua, "Variable-Rate Variable-Power MQAM for Fading Channels", 1997 IEEE, vol. 45, No. 10, Oct. 1997, pp. 1218-1230.

European Search Report dated Nov. 20, 2003 issued in a counterpart application, namely, Appln. No. 03252194.0.

3GPP TSG RAN WG2, Las Vegas, USA, Feb. 27-Mar. 2, 2001, Description of the eigenbeamformer concept (update) and performance evaluation, pp. 1-9.

* cited by examiner

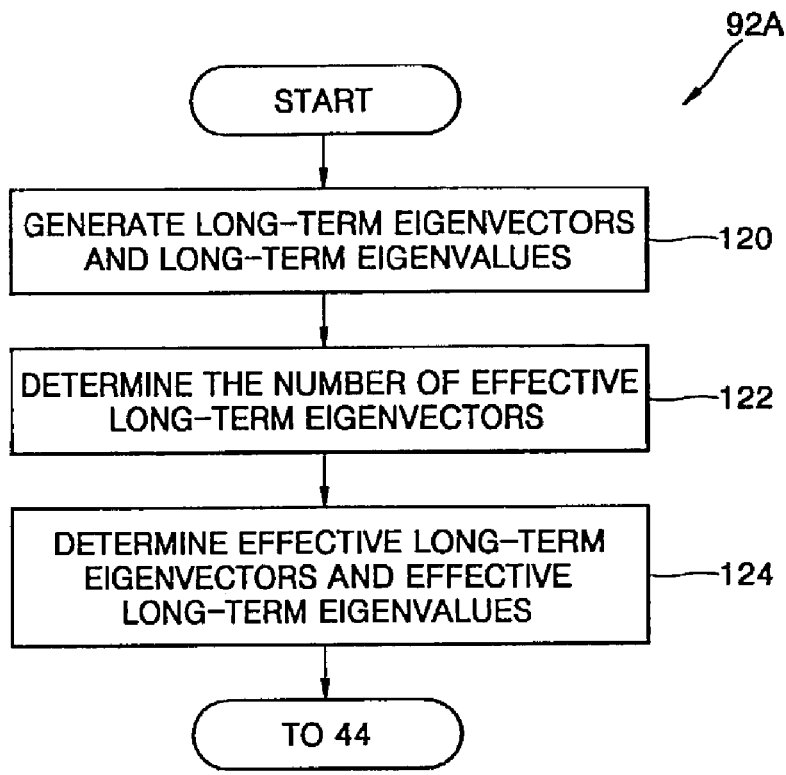
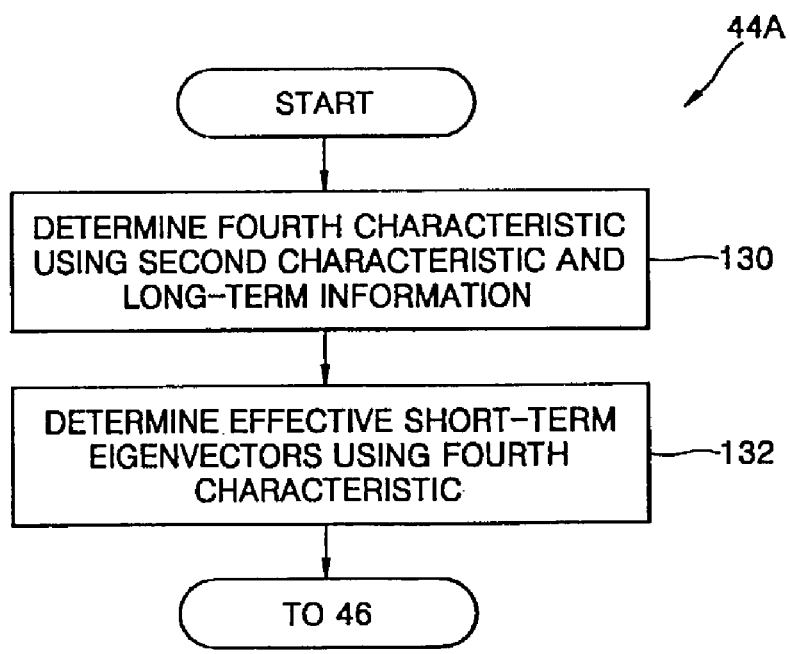

MOBILE COMMUNICATION APPARATUS WITH MULTIPLE TRANSMISSION AND RECEPTION ANTENNAS AND MOBILE COMMUNICATION METHOD THEREFOR

PRIORITY

This application claims priority to an application entitled "MOBILE COMMUNICATION APPARATUS WITH MULTIPLE TRANSMISSION AND RECEPTION ANTENNAS AND MOBILE COMMUNICATION METHOD THEREFOR", filed in the Korean Industrial Property Office on Apr. 9, 2002 and assigned Serial No. 2002-19299, the contents of which are hereby incorporated by reference.

BACKGROUND OF THE INVENTION

1. Field of the Invention

The present invention relates generally to mobile communications, and more particularly, to a mobile communication apparatus with multiple transmission and reception antennas and a mobile communication method therefor, which minimizes effects of fading, interference and noise.

2. Description of the Related Art

Next-generation mobile communication systems require high-speed data transmission, faster than the mobile communication systems for personal communication service. As a wireless communication standard, Europe and Japan have adopted the wideband code division multiple access (W-CDMA) scheme, and North America has adopted the CDMA-2000 scheme.

A mobile communication system is commonly constructed of a base station and a plurality of mobile stations communicating with each other via the base station. High-speed data transmission in a mobile communication system can be achieved by minimizing user co-interference and signal loss, such as fading, affected by channel characteristics. Diversity techniques have been applied to prevent unstable communications due to fading. One such technique, a space diversity technique, uses multiple antennas.

Use of multiple antennas is considered to be necessary for future mobile communication systems as it can minimize user co-interference. A transmission multiple antenna system used to increase the capacity of a transmitter, which employs a diversity technique using multiple antennas to counteract signal fading, requires a wide bandwidth for transmission due to a feature of next generation mobile communications.

For high-speed data transmission, it is essential to solve the problem of signal fading, which is the most significant channel characteristic affecting the performance of common mobile communication systems. This is because fading may reduce the amplitude of a received signal up to tens of dB. Many kinds of diversity techniques are applied to overcome fading. A common CDMA technique utilizes a Rake receiver, which receives multiple path signals using the delay spread of a channel and corresponds to a reception diversity technique. However, this reception diversity technique is not effective when the delay spread is small.

Doppler spread channels require a time diversity technique using interleaving and coding techniques. However, the time diversity technique cannot be applied to a low-speed Doppler channel. An interior channel with a small delay spread and a pedestrian channel, which is a typical example of a low-speed Doppler channel, require a space diversity technique to counteract fading. The space diversity technique uses two or more antennas to overcome signal attenuation due to fading during transmission by switching antennas. Space diversity is classified into reception antenna diversity requiring reception antennas and transmission antenna diversity requiring transmission antennas. It is impractical in terms of cost and space utilization to adopt reception antenna diversity at individual mobile stations; instead, transmission antenna diversity is adopted at the base station.

Transmission antenna diversity is categorized into closed-loop transmission diversity where mobile stations feed downlink channel information back to the base station and open-loop transmission diversity where no feedback occurs from mobile stations to the base station. According to a transmission diversity approach, a mobile station determines the phase and magnitude on each channel to find optimal weight values. For this determination of the phase and amplitude on the channel, the base station transmits a pilot signal through each antenna to the mobile station. Then, the mobile station determines the magnitude and phase on the channel from each pilot signal and finds optimal weight values based on the magnitude and phase on the channel.

In transmission antenna diversity, diversity effects and a signal-to-noise ratio improve as the number of antennas increases. However, the improvement of diversity efficiency decreases as the number of antennas (or signal transmission paths) used at the base station, i.e., the degree of diversity, increases. Therefore, continuing to increase the number of antennas beyond a certain point merely to achieve an extremely high diversity effect would be costly and impractical. However, increasing the number of antennas used in the base station to minimize the power of interference signals and to maximize the internal signal-to-noise ratio is an effective and quite practical technique.

A transmission adaptive antenna array system that provides diversity effects as well as beamforming effects to protect an internal signal from interference and noise is called a "downlink beamforming system." Particularly, a system that utilizes feedback information as in transmission diversity is called a "closed loop downlink beamforming system." Closed downlink beam forming systems that use information fed back from mobile stations to the base station require a sufficiently wide feedback channel bandwidth. If the feedback channel bandwidth is not sufficiently wide, communication performance degrades due to poor adaptability to channel information variations.

The European IMT-2000 standardization association has adopted transmission antenna array (TxAA) modes 1 and 2, which are closed loop transmission diversity schemes for two antennas, in the 3 GPP ($3^{RD}$ Generation Partnership Project) R (Release) 99 version. TxAA mode 1, suggested by Nokia, feeds back only a phase variation between two antennas, whereas TxAA mode 2, suggested by Motorola, feeds back the gains as well as phases of two antennas. TxAA modes 1 and 2 are disclosed in the specification for the UMTS (Universal Mobile Telecommunications System) by the 3 GPP.

TxAA mode 1 or 2 for closed loop transmission diversity uses an adaptive antenna array and applies different complex number weights to each antenna of the adaptive transmission antenna array. The weights applied to the adaptive antenna array are associated with transmission channels and thus are expressed as, for example, w=h*. Here, w is a transmission antenna array weight vector, and h is a transmission array channel vector. Hereinafter, bold symbols indicate vectors and non-bold symbols indicate scalars.

In general, in a mobile communications system using a frequency division duplex (FDD) technique, transmission and reception channels have different characteristics, so there is need to feed back transmission channel information by the base station to identify the characteristic of a transmission channel h. According to TxAA mode 1 or 2, a mobile station calculates weight information w to be obtained from the channel information h and feeds the calculated weight information back to the base station.

TxAA mode 1 quantizes only the phase component of the weight information w, $\theta_2-\theta_1$, into two bits and feeds back the result of the quantization. The weight information w is expressed as $w=[|w_1|\exp(j\theta_1), |w_2|\exp(j\theta_2)]$, where $w_1$ and $w_2$ are scalars. Here, the phase accuracy is $\pi/2$, and the maximum quantization error is $\pi/4$. A refined mode of updating only one of two bits at every time point is applied to increase feedback efficiency. As an example, possible combinations of two bits include $\{b(2k), b(2k-1)\}$ and $\{b(2k), b(2k+1)\}$, where b indicates a bit fed back during every consecutive time slot.

TxAA mode 2 feeds back both the constituents, i.e., the phase and gain, of the weight information. The phase of the weight information is fed back as 3 bits, and the gain of the weight information is fed back as 1 bit. Therefore, the phase accuracy is $\pi/4$, and the maximum quantization error is $\pi/8$. A progressive refined mode of updating only one of four bits at every time point is applied to increase feedback efficiency. In this progressive refined mode, there is no restriction that each bit be an orthogonal basis value, unlike in the refined mode where each bit is an orthogonal basis value.

The above-described TxAA modes 1 and 2 have the following problems when the number of antennas and space-time channel characteristics vary.

First, when the number of antennas increases, the quantity of weights for each antenna that should be fed back also increases, and thus communication performance may degrade depending on the migration speed of a mobile station. With increasing migration speed of a mobile station, space-time channel variations become serious on a common fading channel. In this case, the feedback speed of channel information should be increased. For this reason, if the feedback speed of channel information is limited, communication performance may degrade due to an increase in the amount of feedback information with an increasing number of antennas.

Second, when antennas are not spaced sufficiently far apart, the correlation between channels for each antenna increases. This increased channel-to-channel correlation reduces the quantity of information carried in a channel matrix. Use of an effective feedback scheme can prevent communication performance degradation occurring with a mobile station migrating at a rapid speed, even with the increasing number of antennas. However, because TxAA modes 1 and 2 are defined under the assumption that space-time channels for two antennas are independent, efficiency is not ensured when the number of antennas and space-time channel characteristics vary. In addition, TxAA modes 1 and 2 have not been applied for circumstances using more than two antennas.

SUMMARY OF THE INVENTION

To solve the above-described and other problems, it is an object of the present invention to provide a mobile communication apparatus with multiple transmission and reception antennas, in which minimum amounts of long-term information and short-term information reflecting the downlink characteristic of spatial channels for each of the transmission and reception antennas of the base station and mobile stations, which have multiple transmission and reception antennas, respectively, are fed back from a mobile station to a base station to minimize the effects of interference, noise, and fading, and to maximize data transmission throughput.

It is another object of the present invention to provide a mobile communication method performed in the above mobile communication apparatus with the multiple transmission and reception antennas.

According to an aspect of the present invention, there is provided a mobile communication apparatus with multiple transmission and reception antennas. The apparatus comprises a base station and a mobile station, wherein the base station with at least one transmission antenna restores long-term information, short-term information, a signal to interference and noise ratio (SINR) from a feedback signal received from the mobile station, spatially processes dedicated physical channel (DPCH) signals using basis information generated from the restored long-term information, short-term information and SINR and transmits the results of adding pilot channel (PICH) signals to the spatially processed results to the mobile station. The mobile station with at least one reception antenna determines a first characteristic corresponding to the channel downlink characteristic for each of the transmission and reception antennas, from the PICH signals transmitted from the base station, determines the long-term information, the short-term information, and downlink power control information including the SINR, which reflect the first characteristic, converts the determined long-term information, short-term information, and downlink power control information into the feedback signal, and transmits the feedback signal to the base station. Here, the long-term information includes effective long-term eigenvectors and effective long-term eigenvalues, the short-term information includes effective short-term eigenvectors, and the downlink power control information indicates whether to increase or decrease downlink transmission power.

According to another aspect of the present invention, there is provided a mobile communication method performed between a base station with at least one transmission antenna and a mobile station with at least one reception antenna. The method comprising a steps of: restoring long-term information, short-term information, and an SINR determined in the mobile station reflecting a first characteristic corresponding to a channel downlink characteristic for each of the transmission and reception antennas, from a feedback signal received from the mobile station, spatially processing DPCH signals using basis information generated from the restored long-term information, the short-term information, and the SINR, adding PICH signals to the spatially processed results, and transmitting the added results to the mobile station, wherein the long-term information includes effective long-term eigenvectors and effective long-term eigenvalues, and the short-term information includes effective short-term eigenvectors.

BRIEF DESCRIPTION OF THE DRAWINGS

The above and other objects, features, and advantages of the present invention will become more apparent by describing in detail, preferred embodiments thereof with reference to the attached drawings in which:

FIG. 7 is a flowchart illustrating an embodiment of Step 92 of FIG. 5 according to the present invention;

FIG. 8 is a flowchart illustrating an embodiment of Step 44 of FIG. 3 according to the present invention;

DETAILED DESCRIPTION OF THE INVENTION

The structure and operation of a mobile communication apparatus with multiple transmission and reception antennas, and a mobile communication method performed in the mobile communication apparatus of the present invention will be described in detail herein below with reference to the appended drawings.

Figure 1:
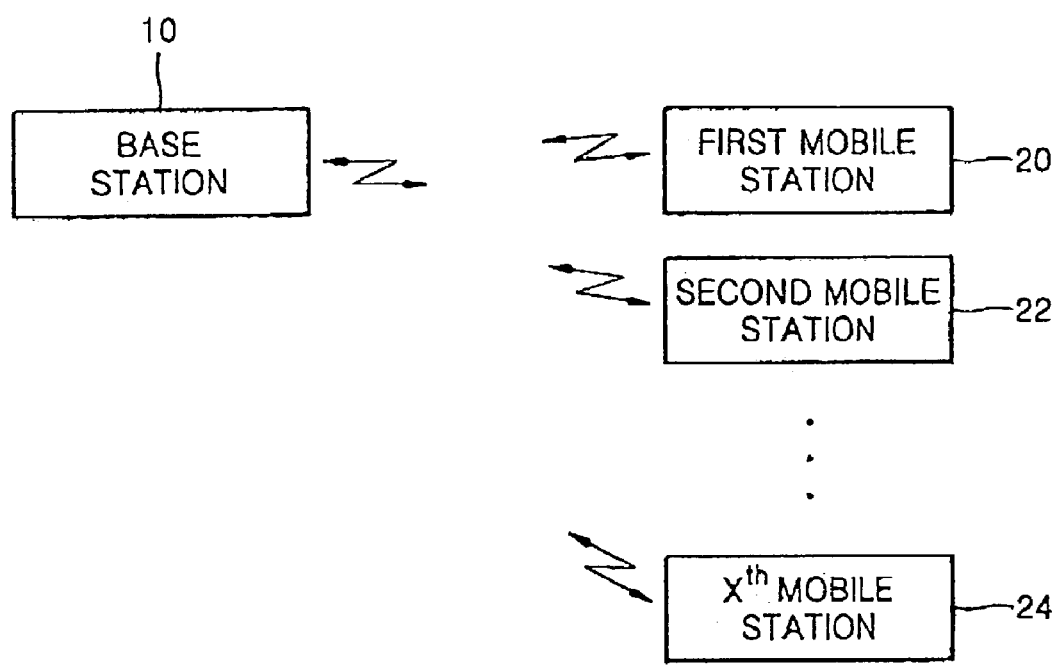
FIG. 1 illustrates a mobile communication apparatus according to the present invention.

Referring to FIG. 1, which is a schematic view of a mobile communication apparatus according to the present invention, the mobile communication apparatus includes a base station 10, and a first mobile station 20, a second mobile station 22, ..., and an X$^{th}$ mobile station 24.

Figure 2:
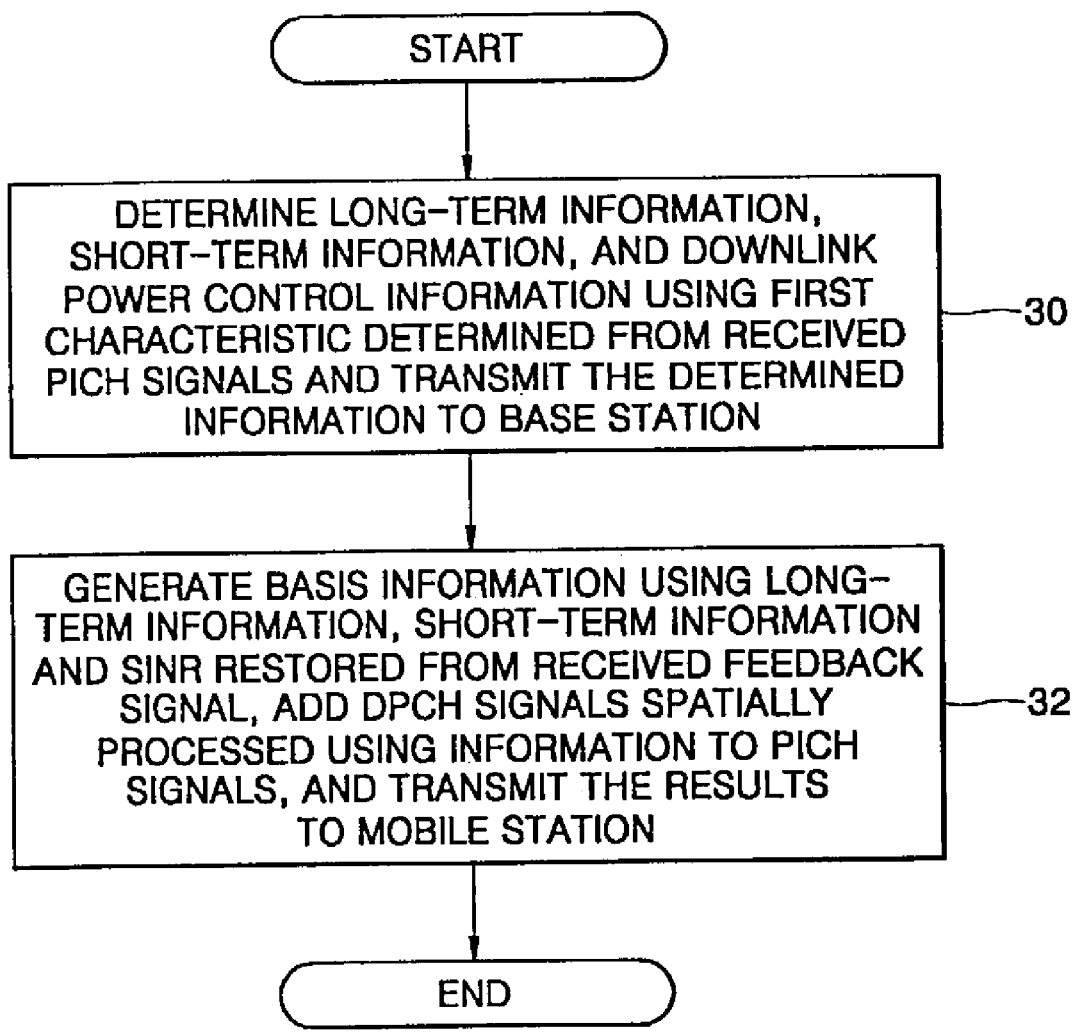
FIG. 2 is a flowchart illustrating a mobile communication method according to the present invention performed in the mobile communication apparatus of FIG. 1.

FIG. 2 is a flowchart illustrating a mobile communication method according to the present invention performed in the mobile communication apparatus illustrated in FIG. 1. The mobile communication method illustrated in FIG. 2 involves obtaining a feedback signal (Step 30), and adding dedicated physical channel (DPCH) signals spatially processed using long-term information, short-term information, and a signal to interference and noise ratio (SINR) restored from the feedback signal to pilot channel (PICH) signals and transmitting the added results (Step 32).

Each of the first through X$^{th}$ mobile stations 20 through 24 illustrated in FIG. 1 perform the same function. The base station 10 includes at least one transmission antenna, and each of the first through X$^{th}$ mobile stations 20 through 24 includes at least one reception antenna and may be implemented, for example, with a terminal.

The base station 10 restores the long-term information, the short-term information, and the SINR from the feedback signal received from the first, second, ..., or X$^{th}$ mobile stations 20, 22, ..., or 24, spatially processes the DPCH signals using basis information generated from the restored long-term information, short-term information, and SINR, adds the spatially processed DPCH signals to the PICH signals, and transmits the added results to the first, second, ..., or X$^{th}$ mobile stations 20, 22, ..., or 24 (Step 32). Here, the PICH signals, which are expressed as $P_i(k)$, where 1 i B, and B is an integer greater than or equal to 1, indicating the number of transmission antennas, may be common pilot channel (CPICH) signals, dedicated CPICH (DCPICH) signals, secondary CPICH (SCPICH) signals, etc.

When the base station 10 according to the present invention is able to operate as described above, the first, second, ..., and X$^{th}$ mobile stations 20, 22, ..., and 24, each of which has at least one reception antenna, can be implemented with any means as long as the first, second, ..., and X$^{th}$ mobile stations 20, 22, ..., and 24 can determine long-term information, short-term information, and downlink power control information, including a SINR, which reflect the channel downlink characteristic (hereinafter, "first characteristic H", where H is a matrix) for each transmission and reception antenna. As indicated above, bold symbols indicate vectors and non-bold symbols indicate scalars. The channel downlink characteristic H for each transmission and reception antenna indicates the phase and amplitude, or gain of a signal transmitted from the base station 10 through a channel to the mobile station 20, 22, ..., or 24. Here, the matrix of the first characteristic H consists of channels for transmission antennas of the base station 10 in columns and channels for reception antennas of the first, second, ..., or X$^{th}$ mobile stations 20, 22, ..., 24 in rows. The column components of the matrix of the first characteristic H are obtained in the transmission antenna space, and the row components thereof are obtained in the reception antenna space.

As an example, the first, second, ..., or X$^{th}$ mobile station 20, 22, ..., or 24 determines the first characteristic H from the PICH signals transmitted from the base station 10, determines long-term information, short-term information, and downlink power control information, which reflect the correlation of the characteristics between channels for each transmission and reception antenna, from the first characteristic H, converts the determined long-term information, short-term information, and downlink power control information into a feedback signal, and transmits the feedback signal to the base station 10 (Step 30). The long-term information includes effective long-term eigenvectors and effective long-term eigenvalues, the short-term information includes effective short-term eigenvectors, and the downlink power control information includes information as to whether to increases or decreases downlink transmission power.

For the convenience of understanding the present invention, embodiments of the first, second, ..., or X$^{th}$ mobile station 20, 22, ..., 24 and Step 30 according to the present invention will be described first with reference to the appended drawings, followed by descriptions of embodiments of the base station 10 and Step 32 of FIG. 2 according to the present invention.

Figure 3:
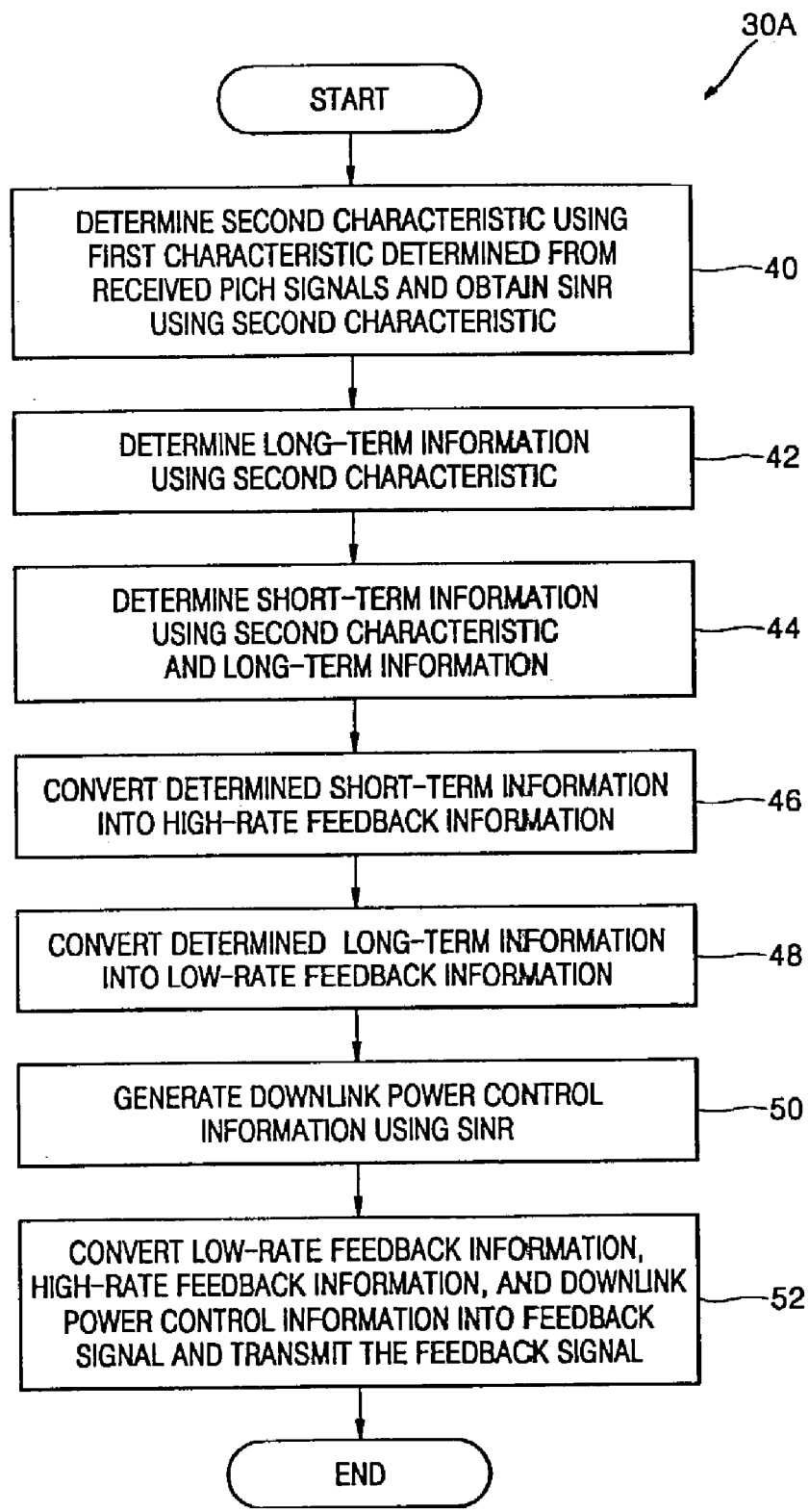
FIG. 3 is a flowchart illustrating an embodiment of Step 30 of FIG. 2 according to the present invention.

FIG. 3 is a flowchart illustrating an embodiment 30A of Step 30 illustrated in FIG. 2 according to the present invention. This embodiment involves determining the first characteristic H and obtaining a SINR in Step 40, determining the long-term information and short-term information of the channel in Steps 42 and 44, obtaining high-rate feedback information, low-rate feedback information, and downlink power control information in Steps 46 through 50, and converting the determined high-rate feedback information, low-rate feedback information, and downlink power control information into the feedback signal in Step 52.

Figure 4:
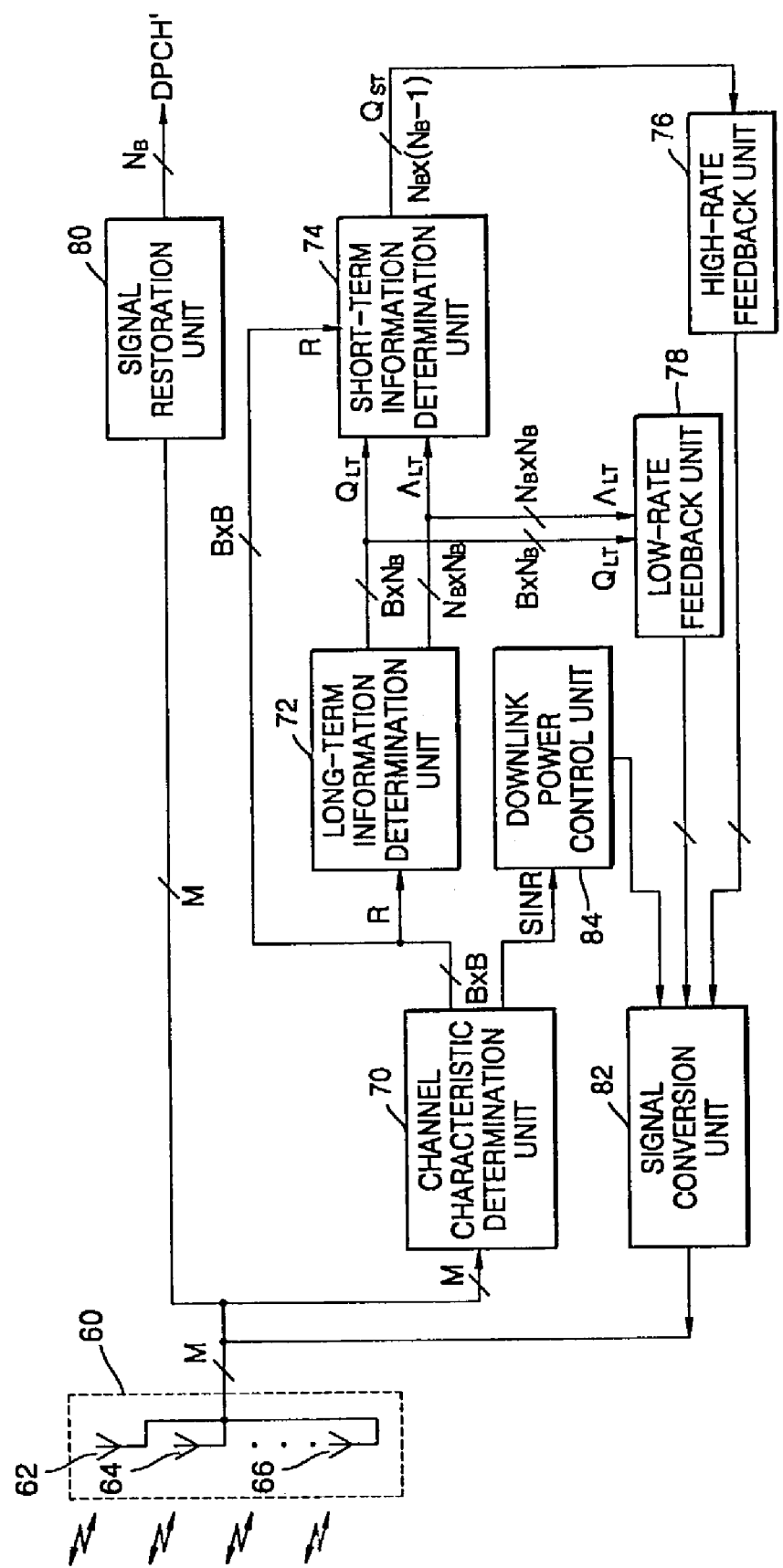
FIG. 4 is a block diagram illustrating an embodiment according to the present invention of a first mobile station, second mobile station, or X$^{th}$ mobile station illustrated in FIG. 1.

FIG. 4 is a block diagram illustrating an embodiment according to the present invention of the first mobile station 20, the second mobile station 22, ..., or the $X^{th}$ mobile station 24 illustrated in FIG. 1. The mobile station illustrated in FIG. 4 includes an antenna array 60, a channel characteristic determination unit 70, a long-term information determination unit 72, a short-term information determination unit 74, a high-rate feedback unit 76, a low-rate feedback unit 78, a signal restoration unit 80, a signal conversion unit 82, and a downlink power control unit 84.

The antenna array 60 of FIG. 4 includes M reception antennas 62, 64, ..., 66, where M is an integer greater than or equal to 1, and receives the spatially processed DPCH signals and PICH signals transmitted from the base station 10. The channel characteristic determination unit 70 determines the first characteristic H from the PICH signals transmitted from the base station 10 and received through the antenna array 60, determines an instantaneous correlation of the channel downlink characteristic (hereinafter, "second characteristic R") for each transmission and reception antenna, from the first characteristic H using equation 1 below, outputs the determined second characteristic R to the long-term information determination unit 72 and the short-term information determination unit 74, obtains an SINR for downlink power control from the determined second characteristic R using equation 2 below, and outputs the obtained SINR to the downlink power control unit 84 in Step 40. The second characteristic R is expressed as B B matrix.

$$R = H^H \cdot H \quad (1)$$

$$SINR = \Sigma diag(R) \quad (2)$$

After Step 40, the long-term information determination unit 72 determines effective long-term eigenvectors $Q_{LT}$ and effective long-term eigenvalues $\Lambda_{LT}$, which constitute the long-term information, from the second characteristic R determined by the channel characteristic determination unit 70 and outputs the determined effective long-term eigenvectors $Q_{LT}$ and effective long-term eigenvalues $\Lambda_{LT}$ to the short-term information determination unit 74 and the low-rate feedback unit 78, respectively in Step 42. Here, long-tern eigenvalues have a one-to-one mapping relation with long-term eigenvectors. Long-term eigenvectors, which are mapped one-to-one with the effective long-term eigenvalues $\Lambda_{LT}$, are referred to as the effective long-term eigenvectors $Q_{LT}$. The effective long-term eigenvectors $Q_{LT}$ are in a B $N_B$ matrix, and the effective long-term eigenvalues $\Lambda_{LT}$ are in a $N_B$ $N_B$ matrix.

Hereinafter, embodiments of Step 42 of FIG. 3 and the long-term information determination unit 72 of FIG. 4 according to the present invention will be described with reference to the appended drawings.

Figure 5:
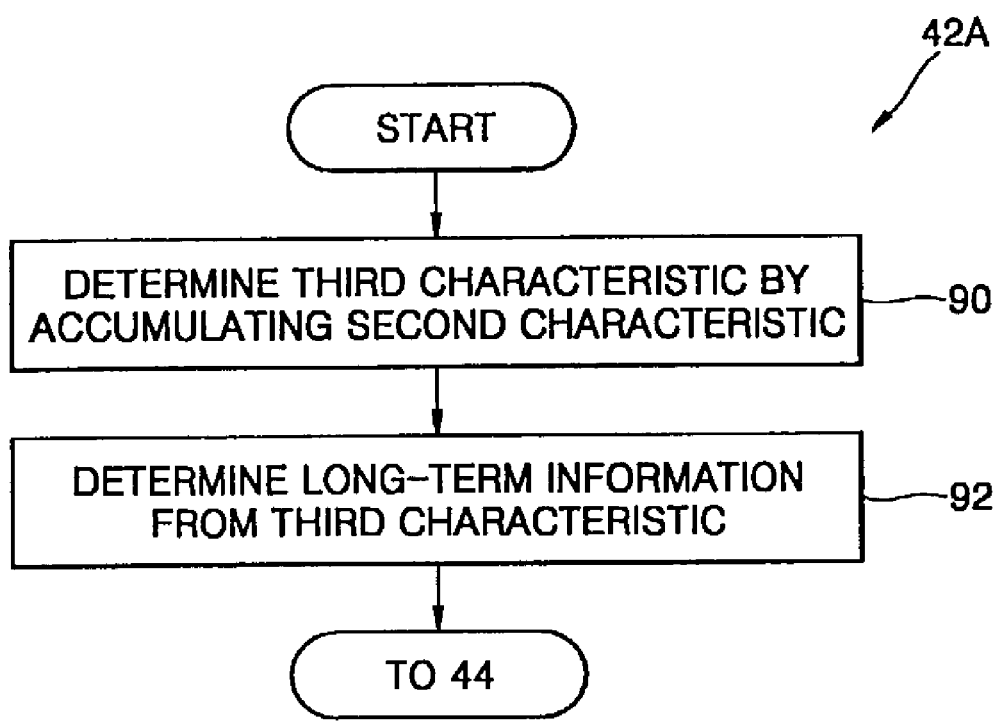
FIG. 5 is a flowchart illustrating a preferred embodiment for Step 42 of FIG. 3 according to the present invention.

FIG. 5 is a flowchart illustrating a preferred embodiment 42A of Step 42 illustrated in FIG. 3 according to the present invention. This embodiment involves obtaining a long-term correlation of the channel downlink characteristic for each transmission and reception antenna by accumulating the second characteristic R in Step 90 and determining the long-term information from the obtained long-term correlation of the channel downlink characteristic in Step 92.

Figure 6:
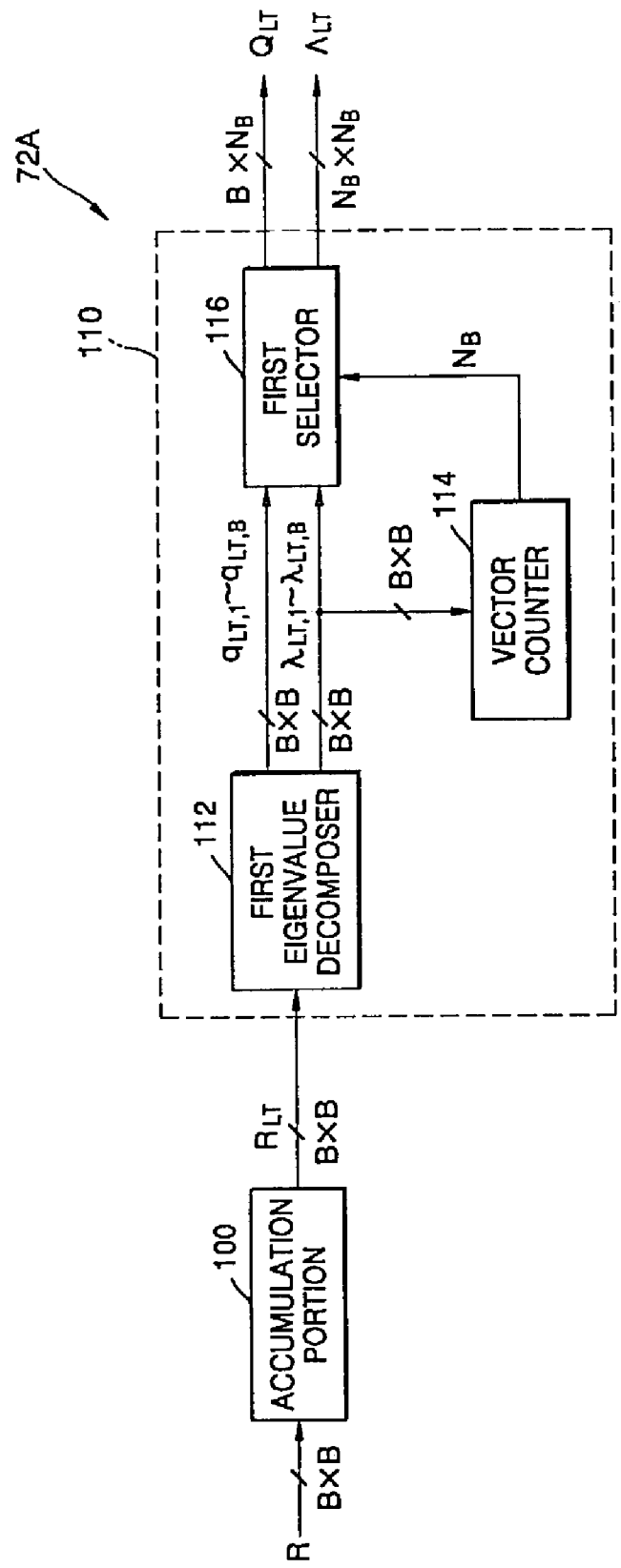
FIG. 6 is a block diagram illustrating an embodiment of a long-term information determination unit of FIG. 4 according to the present invention.

FIG. 6 is a block diagram illustrating an embodiment 72A of the long-term information determination unit 72 of FIG. 4 according to the present invention. The embodiment 72A includes an accumulation portion 100 and a first eigenvalue decomposition and calculation portion 110.

After Step 40 of FIG. 3, the accumulation portion 100 of FIG. 6 accumulates the second characteristic R input from the channel characteristic determination unit 70 and outputs the accumulated result $R_{LT}(k)$ to the first eigenvalue decomposition and calculation portion 110 as the long-term correlation of the channel downlink characteristic (hereinafter, "third characteristic $R_{LT}$") for each transmission and reception antenna in Step 90. The third characteristic $R_{LT}$, i.e., the accumulated result $R_{LT}(k)$, is expressed as B B matrix, as in equation 3 below:

$$R_{LT} = \Sigma H^H \cdot H = \Sigma R$$

$$R_{LT}(k) = \rho R_{LT}(k-1) + R(k) \quad (3)$$

where $\rho$ is a forgetting factor, and k indicates a discrete time.

After Step 90, the first eigenvalue decomposition and calculation portion 110 generates the effective long-term eigenvectors $Q_{LT}$ and effective long-term eigenvalues $\Lambda_{LT}$, which correspond to the long-term information, using the third characteristic $R_{LT}$ input from the accumulation portion 100 by an eigenvalue decomposition (EVD) method and outputs the generated effective long-term eigenvectors $Q_{LT}$ and effective long-term eigenvalues $\Lambda_{LT}$ to the short-term information determination unit 74 and the low-rate feedback unit 78 in Step 92. The EVD technique applied in this embodiment is disclosed in "Matrix Computation", G. Golub and C. Van. Loan, Johns Hopkins University Press, London, 1996.

Hereinafter, embodiments of Step 92 of FIG. 5 and the first eigenvalue decomposition and calculation portion 110 of FIG. 6 of the present invention will be described.

FIG. 7 is a flowchart illustrating an embodiment 92A of Step 92 of FIG. 5 according to the present invention. The embodiment 92A involves selecting the effective long-term eigenvectors $Q_{LT}$ and effective long-term eigenvalues $\Lambda_{LT}$ among long-term eigenvectors and long-term eigenvalues as the long-term information (Steps 120 through 124). For performing the embodiment 92A of FIG. 7, the first eigenvalue decomposition and calculation portion 110 may be implemented with a first eigenvalue decomposer 112, a vector counter 114, and a first selector 116, as illustrated in FIG. 6.

After Step 90 of FIG. 5, the first eigenvalue decomposer 112 generates B B long-term eigenvectors $q_{LT1} \sim q_{LTB}$ and B B long-term eigenvalues $\lambda_{LT1} \sim \lambda_{LTB}$ using the third characteristic $R_{LT}$ input from the accumulation portion 100 by the above-described EVD method, outputs the generated B B long-term eigenvalues $\lambda_{LT1} \sim \lambda_{LTB}$ to the vector counter 114 and the first selector 116, and outputs the generated B B long-term eigenvectors $q_{LT1} \sim q_{LTB}$ to the first selector 116 in Step 120. Next, the vector counter 114 counts the number of long-term eigenvalues $\lambda_{LT1} \sim \lambda_{LTB}$, which is greater than a first predetermined threshold value, determines the counted result as the number of effective long-term eigenvectors, $N_B$, where 1 $N_B$ B, and outputs the determined number of effective long-term eigenvectors, $N_B$, to the first selector 116 in Step 122. To this end, the vector counter 114 may be implemented with a counter (not shown). The first predetermined threshold value is a non-zero value approximating to zero and indicates a noise level in the third characteristic $R_{LT}$.

After Step 122, the first selector 116 selects B long-term eigenvectors from among the B B long-term eigenvectors $q_{LT1} \sim q_{LTB}$ input from the first eigenvalue decomposer 112 and outputs $N_B$ column vectors that consist of the selected B long-term eigenvectors as the effective long-term eigenvectors $Q_{LT}$ in Step 124. In addition, the first selector 116 selects long-term eigenvalues in a quantity equal to the number of effective long-term eigenvectors, $N_B$, from which noises have been removed, among the B B long-term eigenvalues $\lambda_{LT1} \sim \lambda_{LTB}$ input from the first eigenvalue decomposer 112 and outputs a diagonal matrix which consists of the selected long-term eigenvalues as the effective long-term eigenvalues $\Lambda_{LT}$ in Step 124.

After Step 42 of FIG. 3, the short-term information determination unit 74 determines effective short-term eigenvectors $Q_{ST}$, which correspond to the short-term information, using the second characteristic R input from the channel characteristic determination unit 70 and the long-term information including the effective long-term eigenvectors $Q_{LT}$ and the effective long-term eigenvalues $\Lambda_{LT}$ input from the long-term information determination unit 72, and outputs the determined effective short-term eigenvectors $Q_{ST}$ to the high-rate feedback unit 76 in Step 44. The effective short-term eigenvectors $Q_{ST}$ are in a $N_B(N_B-1)$ matrix.

Hereinafter, embodiments of Step 44 of FIG. 3 and the short-term information determination unit 74 of FIG. 4 according to the present invention will be described with reference to the appended drawings.

FIG. 8 is a flowchart illustrating an embodiment 44A of Step 44 of FIG. 3 according to the present invention. The embodiment 44A involves obtaining a short-term correlation of the channel downlink characteristic for each transmission and reception antenna in Step 130 and obtaining the short-term information from the obtained short-term correlation of the channel downlink characteristic in Step 132.

Figure 9:
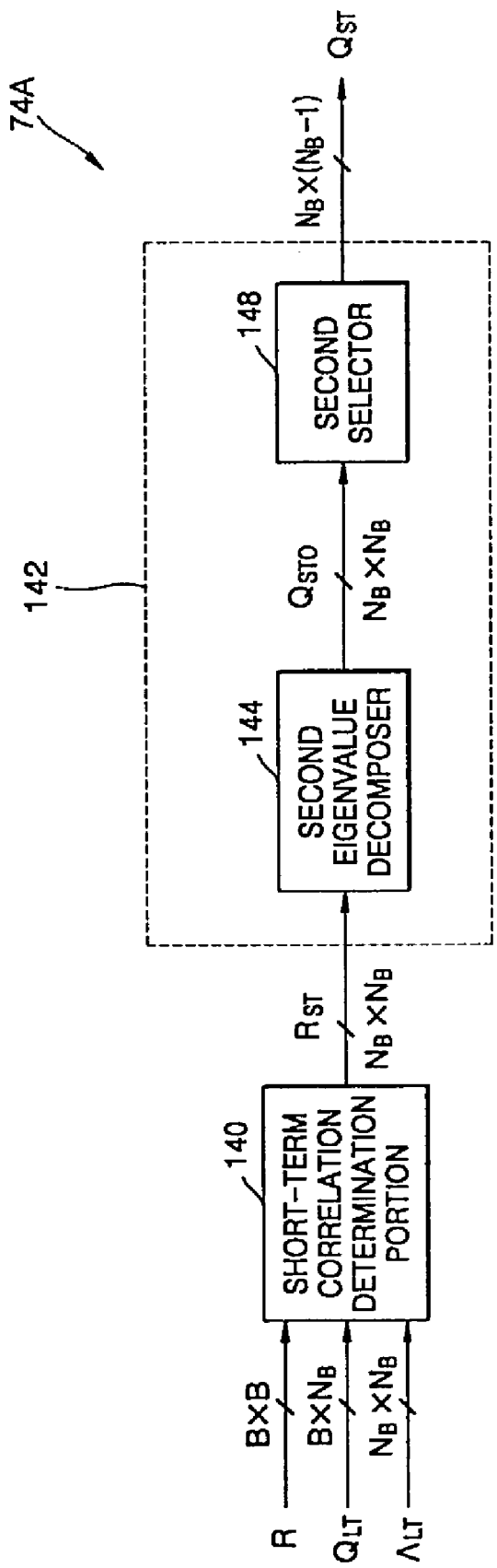
FIG. 9 is a block diagram illustrating a short-term information determination unit of FIG. 4 according to the present invention.

FIG. 9 is a block diagram illustrating an embodiment 74A of the short-term information determination unit 74 of FIG. 4 according to the present invention. The embodiment 74A includes a short-term correlation determination portion 140 and a second eigenvalue decomposition and calculation portion 142.

After Step 42 of FIG. 3, the short-term correlation determination portion 140 determines a short-term correlation (hereinafter, "fourth characteristic $R_{ST}$") of the channel downlink characteristic for each transmission and reception antenna from the second characteristic R input from the channel characteristic determination unit 70 and the long-term information including the effective long-term eigenvectors $Q_{LT}$ and the effective long-term eigenvalues $\Lambda_{LT}$ input from the long-term information determination unit 72, using equation 4 below, and outputs the determined fourth characteristic $R_{ST}$ to the second eigenvalue decomposition and calculation portion 142 in Step 130. The fourth characteristic $R_{ST}$ is expressed as a $N_B N_B$ matrix.

$$R_{ST} = \Lambda_{LT}^{-\frac{1}{2}} Q_{LT}^{H} R Q_{LT} \Lambda_{LT}^{-\frac{1}{2}} \tag{4}$$

After Step 130, the second eigenvalue decomposition and calculation portion 142 determines the effective short-term eigenvectors $Q_{ST}$ from the fourth characteristic $R_{ST}$ input from the short-term correlation determination portion 140 by the above-described EVD method and outputs the determined effective short-term eigenvectors $Q_{ST}$ to the high-rate feedback unit 76 as the short-term information in Step 132.

Hereinafter, embodiments of Step 132 of FIG. 8 and the second eigenvalue decomposition and calculation portion 142 of FIG. 9 will be described.

Figure 10:
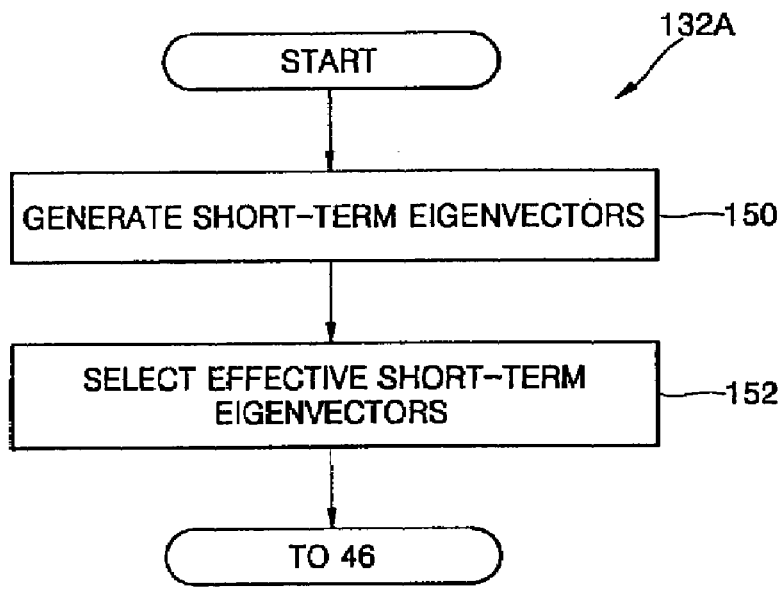
FIG. 10 is a flowchart illustrating an embodiment of Step 132 of FIG. 8 according to the present invention.

FIG. 10 is a flowchart illustrating an embodiment 132A of Step 132 of FIG. 8 according to the present invention. The embodiment 132A involves selecting effective short-term eigenvectors $Q_{ST}$ among short-term eigenvectors as the short-term information (Steps 150 through 152). To implement the embodiment 132A of FIG. 10, the second eigenvalue decomposition and calculation portion 142 may be implemented with a second eigenvalue decomposer 144 and a second selector 148, as illustrated in FIG. 9.

After Step 130 of FIG. 8, the second eigenvalue decomposer 144 generates $N_B$ short-term eigenvectors $Q_{ST0}$ expressed as equation 5 below, using the fourth characteristic $R_{ST}$ input from the short-term correlation determination portion 140 by the above-described EVD method and outputs the generated $N_B$ short-term eigenvectors $Q_{ST0}$ to the second selector 148 in Step 150.

$$Q_{ST0} = [q_{ST0,1}\ q_{ST0,2} \cdots q_{ST0,N_B}] \tag{5}$$

In Step 152, the second selector 148 selects $N_B \times (N_B-1)$ short-term eigenvectors from among the $N_B$ short-term eigenvectors $Q_{ST0}$ input from the second eigenvalue decomposer 144 and outputs column vectors which consists of the selected short-term eigenvectors, expressed as equation 6 below, as the effective short-term eigenvectors $Q_{ST}$.

$$Q_{ST} = [q_{ST0,1}\ q_{ST0,2} \cdots q_{ST0,(N_B-1)}] \tag{6}$$

After Step 44 of FIG. 3, the first mobile station 20, the second mobile station 22, or the $X^{th}$ mobile station 24 converts the short-term information including the effective short-term eigenvectors $Q_{ST}$, the long-term information including the effective long-term eigenvectors $Q_{LT}$ and the effective long-term eigenvalues $\Lambda_{LT}$, and the downlink power control information into a feedback signal which is suitable to be fed back to the base station 10 and transmits the converted feedback signal via the antenna array 60 to the base station 10 (Steps 46 through 52).

To perform Steps 46 through 52, the high-rate feedback unit 76, the low-rate feedback unit 78, the signal conversion unit 82, and the downlink power control unit 84 are involved. After Step 44, the high-rate feedback unit 76 encodes the effective short-term eigenvectors $Q_{ST}$ input from the short-information determination unit 74 as bits and outputs the result of the bit encoding to the signal conversion unit 82 as high-rate feedback information at first predetermined time intervals in Step 46. Then, the low-rate feedback unit 78 encodes the long-term information, including the effective long-term eigenvectors $Q_{LT}$ and the effective long-term eigenvalues $\Lambda_{LT}$, input from the long-term information determination unit 72 as bits, and outputs the result of the bit encoding to the signal conversion unit 82 as low-rate feedback information at second predetermined time intervals in Step 48. Here, the first predetermined time interval is shorter than the second predetermined time interval. For example, the second predetermined time interval may be 10 times longer than the first predetermined time interval. In this case, one bit of the long-term information is output from the low-rate feedback unit 78 to the signal conversion unit 82 while 10 bits of the short-term information are output from the high-rate feedback unit 76 to the signal conversion unit 82. Accordingly, the short information can be transmitted to the signal conversion unit 82 faster than the long-term information.

In Step 50, the downlink power control unit 84 generates downlink power control information using the SINR input from the channel characteristic determination unit 70 and outputs the generated downlink power control information to the signal conversion unit 82. A downlink power control method is disclosed in "CDMA Systems Engineering Handbook", J. S. Lee and L. E. Miller, Artech House Publishers, Boston and London, 1998 (pp. 367-396).

According to the present invention, unlike the illustration of FIG. 3, Steps 46 and 48 may be simultaneously performed. Alternatively, Step 48 may be followed by Step 46. In this case, Step 50 may be formed after Step 48 or at any time between Steps 42 through 48.

Hereinafter, embodiments of Step 50 of FIG. 3 and the downlink power control unit 84 of FIG. 4 according to the present invention will be described with reference to the appended drawings.

Figure 11:
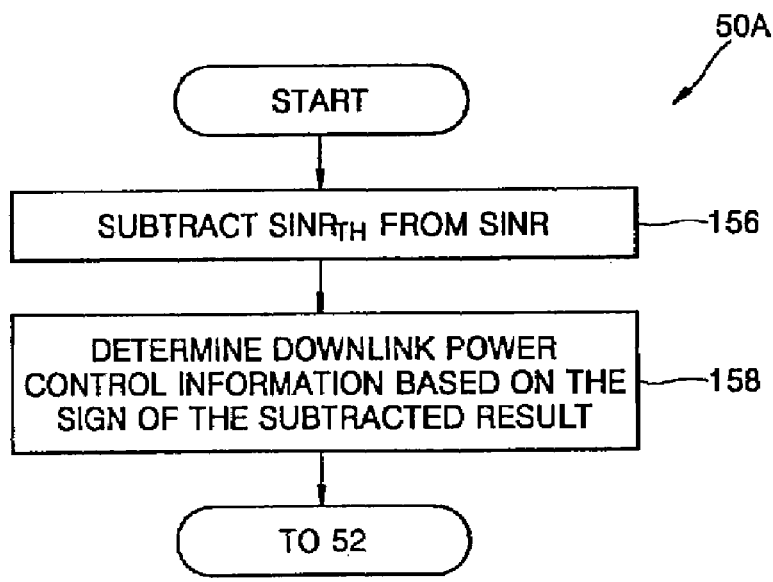
FIG. 11 is a flowchart illustrating an embodiment of Step 50 of FIG. 3 according to the present invention.

FIG. 11 is a flowchart illustrating an embodiment 50A of Step 50 of FIG. 3 according to the present invention. This embodiment 50A involves subtracting a second predetermined threshold value $SINR_{TH}$ from the SINR in Step 156 and determining the downlink power control information based on the sign of the subtracted result in Step 158.

Figure 12:
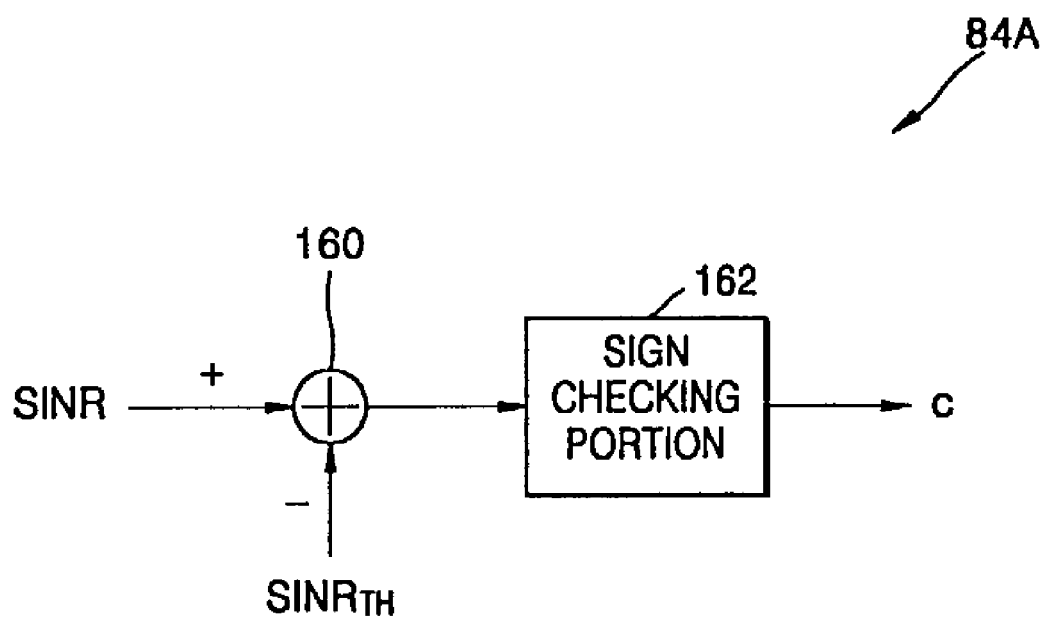
FIG. 12 is a block diagram illustrating a downlink power control unit of FIG. 4 according to the present invention.

FIG. 12 is a block diagram of an embodiment 84A of the downlink power control unit 84 of FIG. 4 according to the present invention. The embodiment 84A includes a subtraction portion 160 and a sign checking portion 162. The subtraction portion 160 of FIG. 12 subtracts the second predetermined threshold value $SINR_{TH}$ from the SINR input from the channel characteristic determination unit 70 and outputs the subtracted result to the sign checking portion 162 in Step 156. In Step 158, the sign checking portion 162 determines the downlink power control information based on the sign of the subtracted result input from the subtraction portion 160 and outputs the determined downlink power control information C to the signal conversion unit 82. For example, if the SINR is determined to be greater than or equal to the second predetermined threshold value $SINR_{TH}$ from the subtracted result, in the sign checking portion 162, the downlink power control information c is set to 1. If the SINR is determined to be smaller than the second predetermined threshold value $SINR_{TH}$, in the sign checking portion 162, the downlink power control information c is set to −1. Here, c=1 indicates decreasing the downlink transmission power, and c=−1 indicates increasing the downlink transmission power.

After Step 50 of FIG. 3, the signal conversion unit 82 multiplexes the high-rate feedback information input from the high-rate feedback unit 76, the low-rate feedback information input from the low-rate feedback unit 78, and the downlink power control information input from the downlink power control unit 84, and outputs the multiplexed result to the antenna array 60 as the feedback signal suitable to be fed back in Step 52. The feedback signal input to the antenna array 60 is transmitted to the base station 10.

According to the present invention, the first mobile station 20, the second mobile station 22, or the $X^{th}$ mobile station 24 may further include a signal restoration unit 80, as illustrated in FIG. 4. At any point of time during Steps 40 through 52, the signal restoration unit 80 restores original DPCH signals from the DPCH signals spatially processed in the base station 10 and received via the antenna array 60 and outputs restored DPCH signals, which will be denoted as DPCH'.

Hereinafter, embodiments of the base station 10 of FIG. 1 and Step 32 of FIG. 2 according to the present invention will be described with reference to the appended drawings.

Figure 13:
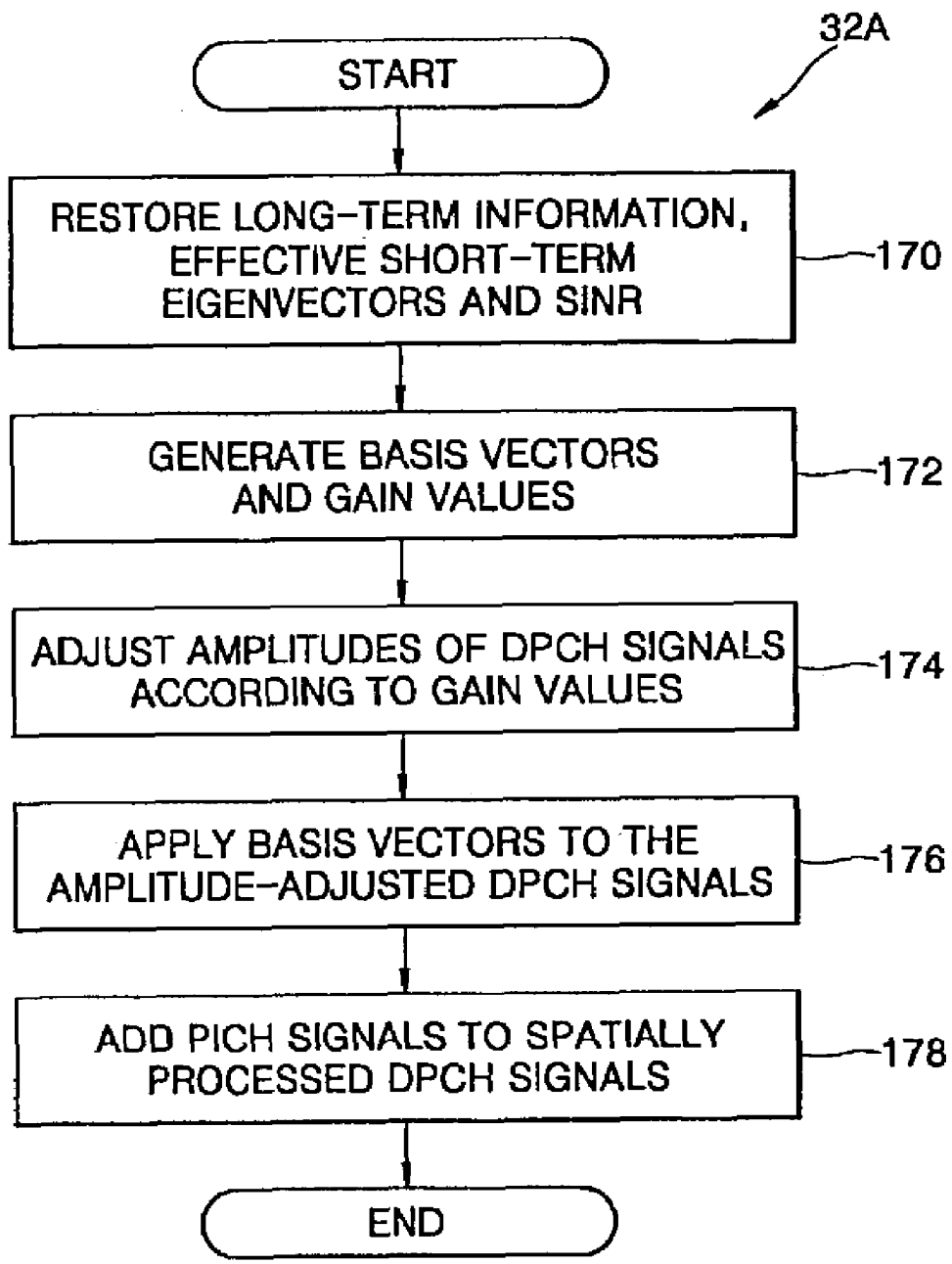
FIG. 13 is a flowchart illustrating an embodiment of Step 32 of FIG. 2 according to the present invention.

FIG. 13 is a flowchart illustrating an embodiment 32A of Step 32 of FIG. 2 according to the present invention. The embodiment 32A involves spatially processing the DPCH signals using restored long-term information, short-term information, and SINR (Steps 170 through 176) and adding pilot channel (PICH) signals to the spatially processed DPCH signals (Step 178).

Figure 14:
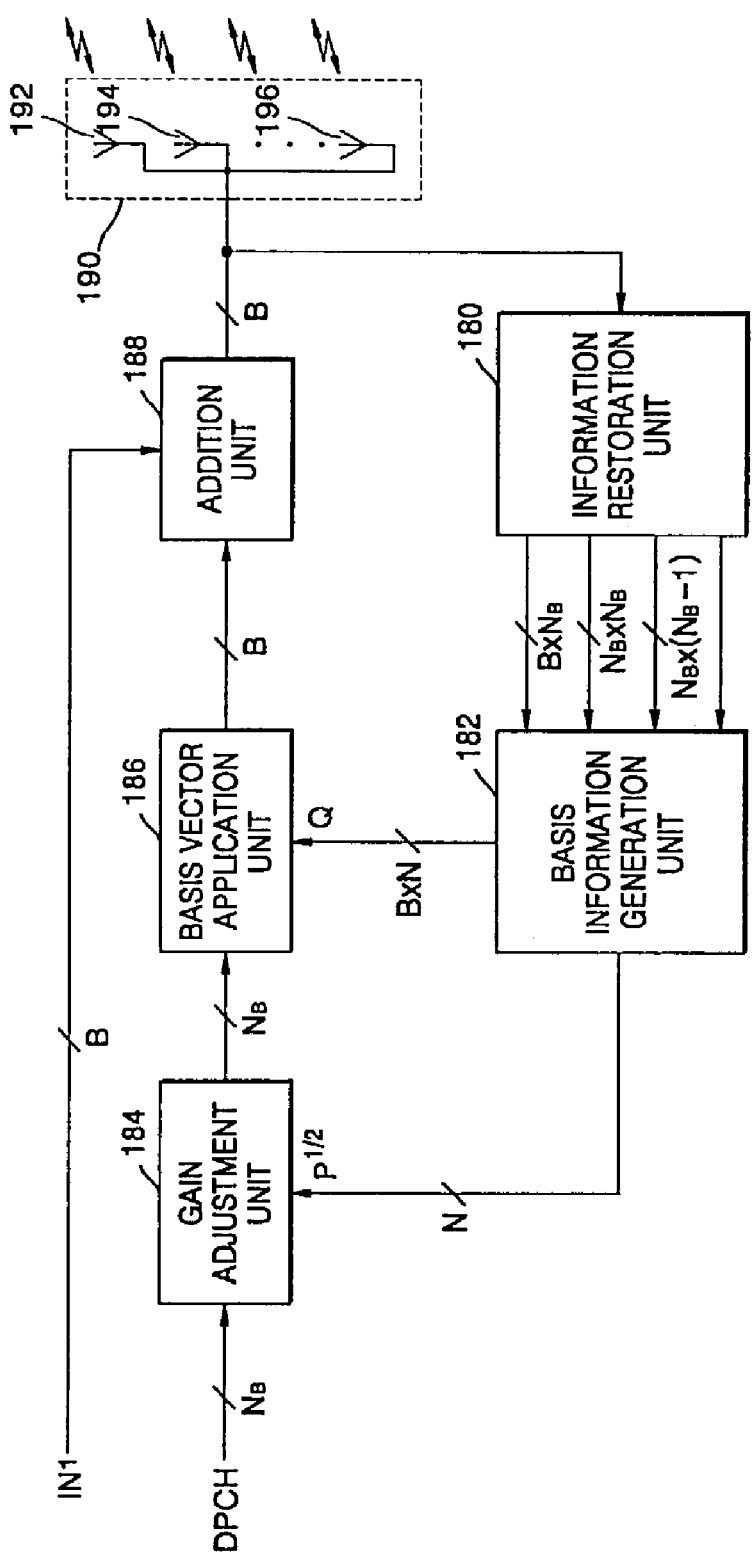
FIG. 14 is a block diagram illustrating an embodiment of a base station of FIG. 1 according to the present invention.

FIG. 14 is a block diagram illustrating an embodiment of the base station 10 of FIG. 1 according to the present invention. In this embodiment, the base station 10 includes an information restoration unit 180, a basis information generation unit 182, a gain adjustment unit 184, a basis vector application unit 186, an addition unit 188, and an antenna array 190. The antenna array 190 of FIG. 14, which includes B transmission antennas 192, 194, . . . , 196, receives the feedback signal via an uplink dedicated physical control channel DPCCH from the first mobile station 22, the second mobile station 22, . . . , or the $X^{th}$ mobile station 24, and transmits the spatially processed DPCH signals and the PICH signals to the first mobile station 20, the second mobile station 22, . . . , or the $X^{th}$ mobile station 24.

After Step 30 of FIG. 2, the information restoration unit 180 restores the long-term information, effective short-term eigenvectors, and SINR from the feedback signal received via the antenna array 190 and outputs the restored long-term information, effective short-term eigenvectors, and SINR to the basis information generation unit 182 in Step 170. Since the long-term information and the effective short-term eigenvectors are output from the high-rate feedback unit 76 and the low-rate feedback unit 78 of FIG. 4 at low and high rates, respectively, via the signal conversion unit 82, the long-term information and short-term information are restored at low and high rates, respectively, by the information restoration unit 180.

After Step 170, the basis information generation unit 182 generates basis vectors Q and gain values $P^{1/2}$ as basis information from the long-term information, effective short-term eigenvectors, and SINR restored by the information restoration unit 180 and outputs the generated gain values $P^{1/2}$ to the gain adjustment unit 184 and the generated basis vectors Q to the basis vector application unit 186 in Step 172. Here, the basis vectors Q are in a B N matrix, and the gain values $P^{1/2}$ are in a N 1 matrix, wherein N indicates the number of basis vectors.

Hereinafter, embodiments of Step 172 of FIG. 13 and the basis information generation unit 182 of FIG. 14 according to the present invention will be described with reference to the appended drawings.

Figure 15:
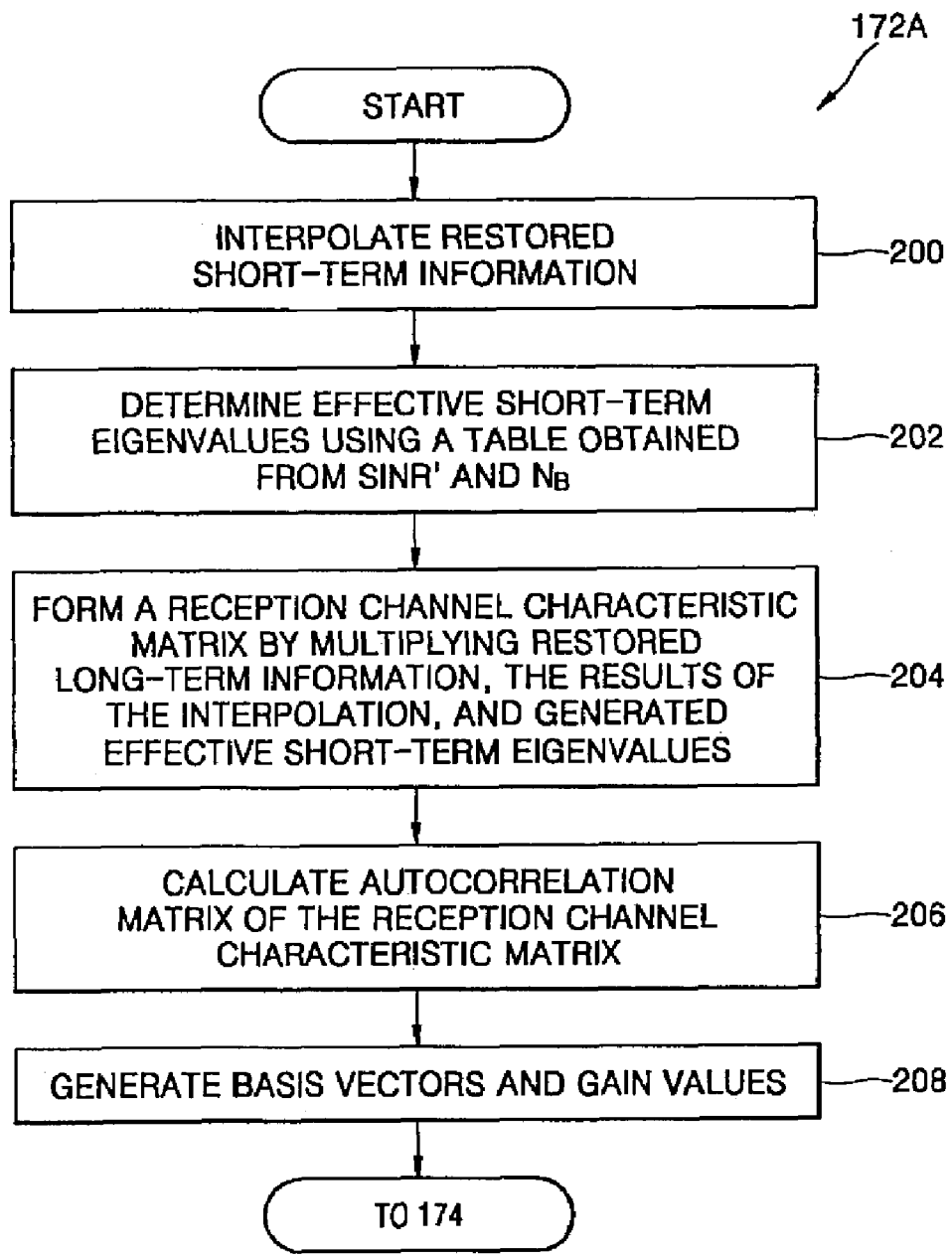
FIG. 15 is a flowchart illustrating an embodiment of Step 172 of FIG. 13 according to the present invention.

FIG. 15 is a flowchart illustrating an embodiment 172A of Step 172 of FIG. 13 according to the present invention. The embodiment 172A involves interpolating the restored short-term information and generating effective short-term eigenvalues (Steps 200 and 202) and determining the basis vectors Q and gain values $P^{1/2}$ from the long-term information and short-term information (Steps 204 through 208).

Figure 16:
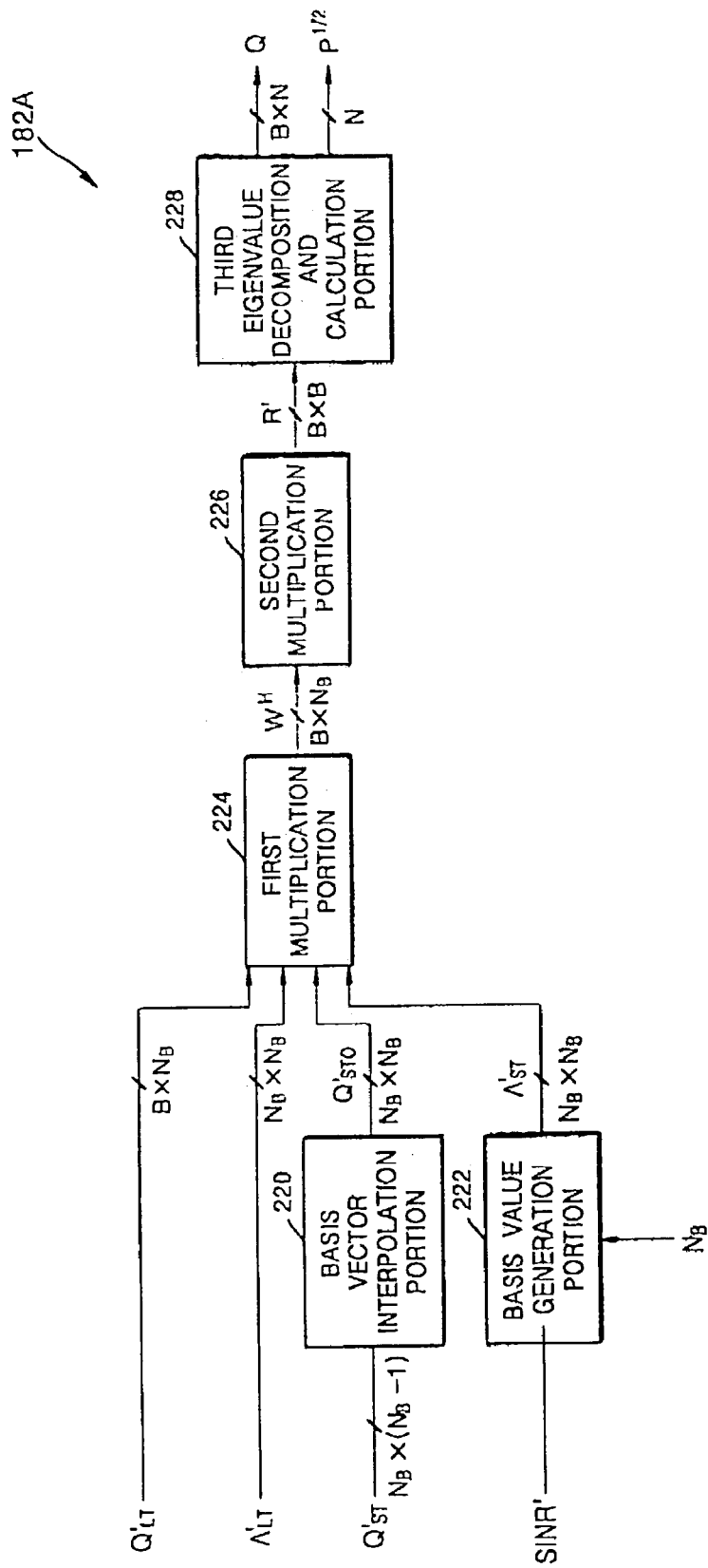
FIG. 16 is a block diagram illustrating an embodiment of a basis information generation unit of FIG. 14 according to the present invention.

FIG. 16 is a block diagram illustrating an embodiment 182A of the basis information generation unit 182 of FIG. 14. The embodiment 182A includes a basis vector interpolation portion 220, a basis value generation portion 222, a first multiplication portion 224, a second multiplication portion 226, and a third eigenvalue decomposition and calculation portion 228.

After Step 170 of FIG. 13, the basis vector interpolation portion 220 interpolates the restored effective short-term eigenvectors $Q'_{ST}$ input from the information restoration unit 180 and outputs the results of the interpolation, $Q'_{STO}$, to the first multiplication portion 224 in Step 200. This interpolation is performed based on the orthogonal relationship between the eigenvectors, using equation 7 below:

$$Q'_{STO} = \lfloor Q'_{ST} q'_{ST,N_B} \rfloor \quad (7)$$

where $Q'_{ST}$ can be expressed as equation 8 below, and the relationship of equation 9 is satisfied:

$$Q'_{ST} = [q'_{ST,0} \cdots q'_{ST,(N_B-1)}] \quad (8)$$

$$q'_{ST,N_B} \cdot q'_{ST,N_B-1} = \cdots = q'_{ST,N_B} \cdot q'_{ST,1} = 0 \quad (9)$$

After Step 200, the basis value generation portion 222 determines effective short-term eigenvalues $\Lambda'_{ST}$ using a table T obtained from the restored signal to interference and noise ratio, SINR', and the number of effective long-term eigenvectors, $N_B$, input from the information restoration unit 180 and outputs the determined effective short-term eigenvalues $\Lambda'_{ST}$ to the first multiplication portion 224 in Step 202. As described above, according to the present invention, although no effective short-term eigenvalues $\Lambda_{ST}$ are fed back from the mobile station 20, 22, ..., or 24 to the base station 10, the effective short-term eigenvalues $\Lambda'_{ST}$ can be obtained from the restored signal to interference noise ratio SINR'.

Figure 17:
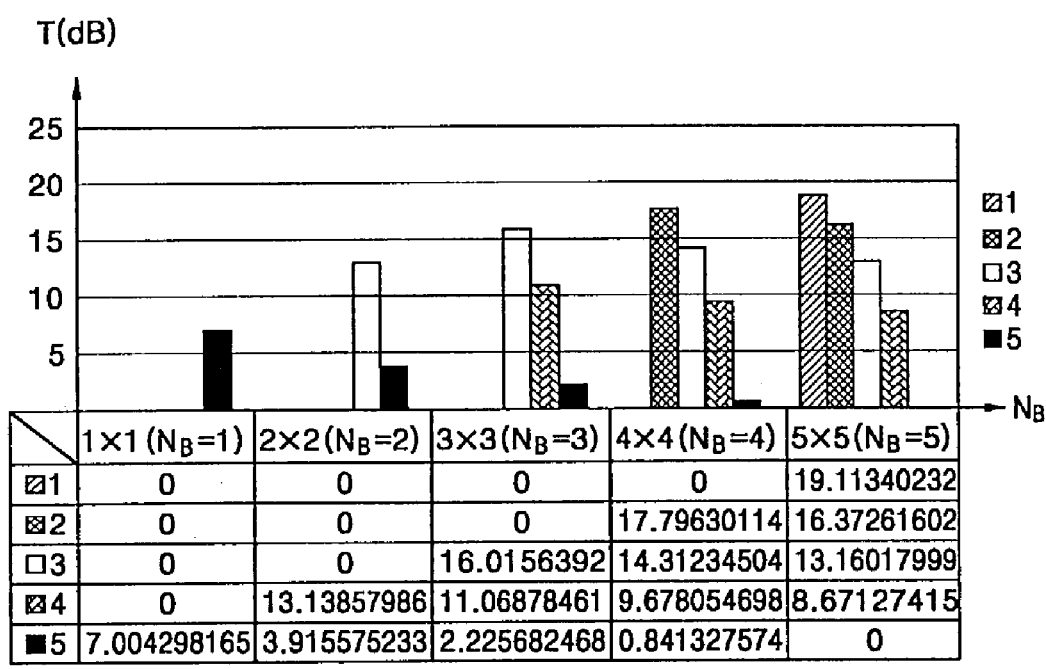
FIG. 17 illustrates an example of a table used to determine effective short-term eigenvalues in the present invention.

FIG. 17 illustrates a table T used to determine the effective short-term eigenvalues $\Lambda'_{ST}$, in which the vertical axis denotes T values, in dB, and the horizontal axis denotes the number of effective long-term eigenvectors, $N_B$.

In an embodiment according to the present invention, the basis value generation portion 222 may store effective short-term eigenvalues $\Lambda'_{ST}$ for various SINR' and number of effective long-term eigenvectors, $N_B$, for example, in a lookup table as illustrated in FIG. 17. In this case, effective short-term eigenvalues $\Lambda'_{ST}$ are read according to the restored SINR' and the number of effective long-term eigenvectors, $N_B$, and output to the first multiplication portion 224.

In another embodiment according to the present invention, the basis value generation portion 222 may calculate table $T(N_B)$ or $T(N_B,\gamma)$ from the SINR' and the number of effective long-term eigenvectors, $N_B$, using equation 10 or 11 below, instead of storing effective short-term eigenvalues in a lookup table.

$$T(N_B) = \frac{E(\Lambda_{ST}(N_B))}{\gamma}, \text{ where } \Lambda_{ST}(N_B) = \begin{bmatrix} \lambda_{ST,1} & 0 & \cdots & 0 \\ 0 & \cdots & \cdots & 0 \\ 0 & 0 & \cdots & \lambda_{ST,N_R} \end{bmatrix} \quad (10)$$

$$T(N_B, \gamma) = \frac{E(\Lambda_{ST}(N_B, \gamma))}{\gamma}, \text{ where } \Lambda_{ST}(N_B, \gamma) = \begin{bmatrix} \lambda_{ST,1}(\gamma) & 0 & \cdots & 0 \\ 0 & \cdots & \cdots & 0 \\ 0 & 0 & \cdots & \lambda_{ST,N_R}(\gamma) \end{bmatrix} \quad (11)$$

In equations 10 and 11 above, $E[\cdot]$ denotes an operator for the ensemble average, $\Lambda_{ST}(N_B)$ denotes a random variable diagonal matrix obtained from an arbitrary fourth characteristic $R_{ST}$ by the EVD method when the number of short-term eigenvectors is equal to $N_B$, $\Lambda_{ST}(N_B,\gamma)$ denotes a random variable diagonal matrix obtained from an arbitrary fourth characteristic $R_{ST}$ by the EVD method when the number of short-term eigenvectors is equal to $N_B$ and the SINR' is $\gamma$. The effective short-term eigenvalues $\Lambda'_{ST}$ can be expressed as equation 12 below from equation 10 for $T(N_B)$ or equation 11 for $T(N_B,\gamma)$ above:

$$\Lambda'_{ST}(N_B) = \gamma T(N_B)$$

or $$\Lambda'_{ST}(N_B,\gamma) = \gamma T(N_B,\gamma) \quad (12)$$

After Step 202, the first multiplication portion 224 multiplies the long-term information input from the information restoration unit 180, the results of the interpolation, $Q'_{STO}$, performed using the restored effective short-term eigenvectors and input from the basis vector interpolation portion 220, and the effective short-term eigenvalues $\Lambda'_{ST}$ generated by the basis vector generation portion 222, as in equation 13 below, and outputs the product $W^H$ to the second multiplication portion 226 as a reception channel characteristic matrix in Step 204. Here, the reception channel characteristic matrix $W^H$ is a B $N_B$ matrix.

$$W^H = Q'_{LT} \Lambda'_{LT}{}^{1/2} Q'_{STO} \Lambda'_{ST}{}^{1/2} \quad (13)$$

where $Q'_{LT}$ and $\Lambda'_{LT}$ denote the long-term information restored by the information restoration unit 180, and particularly, $Q'_{LT}$ denotes restored effective long-term eigenvectors in a B $N_B$ matrix, $\Lambda'_{LT}$ denotes restored effective long-term eigenvalues in a $N_B$ $N_B$ matrix, $Q'_{STO}$ denotes interpolated restored effective short-term eigenvectors in a $N_B$ $N_B$ matrix, and $\Lambda'_{ST}$ denotes restored effective short-term eigenvalues in a $N_B$ $N_B$ matrix.

After Step 204, the second multiplication portion 226 calculates an autocorrelation matrix R', which corresponds to the complex product of the reception channel characteristic matrix $W^H$ output from the first multiplication portion 224, using equation 14 below, and outputs the calculated autocorrelation matrix R' to the third eigenvalue decomposition and calculation portion 228 in Step 206. Here, the autocorrelation matrix R' is a B B matrix.

$$R' = W^H W \quad (14)$$

In Step 208, the third eigenvalue decomposition and calculation portion 228 generates effective instantaneous eigenvectors, i.e., the basis vectors Q, and the gain values $P^{1/2}$ from the autocorrelation matrix R' and outputs the results.

Hereinafter, embodiments of Step 208 of FIG. 15 and the third eigenvalue decomposition and calculation portion 228 of FIG. 16 will be described with reference to the appended drawings.

Figure 18:
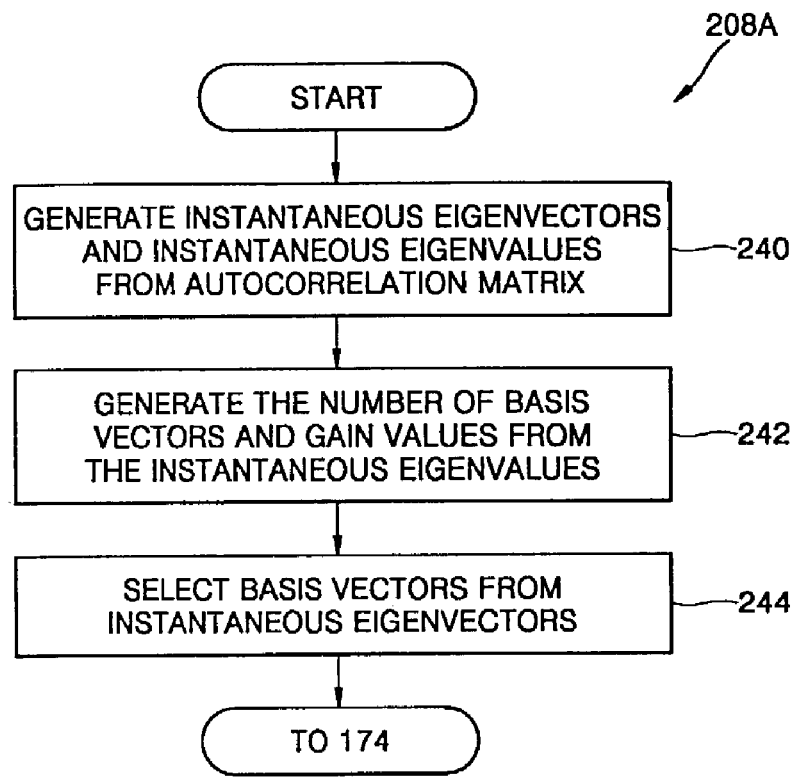
FIG. 18 is a flowchart illustrating an embodiment of Step 208 of FIG. 15 according to the present invention.

FIG. 18 is a flowchart illustrating an embodiment 208A of Step 208 of FIG. 15 according to the present invention. The embodiment 208A involves obtaining the basis vectors Q and the gain values $P^{1/2}$ from instantaneous eigenvectors and eigenvalues (Steps 240 through 244).

Figure 19:
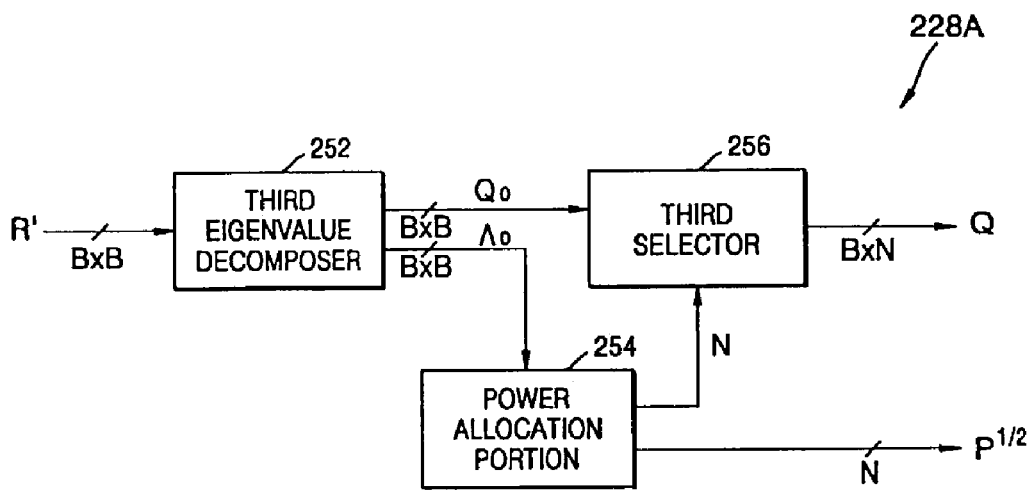
FIG. 19 is a block diagram illustrating a preferred embodiment of a third eigenvalue decomposition and calculation portion of FIG. 16, which performs the embodiment of FIG. 18, according to the present invention.

FIG. 19 is a block diagram illustrating a preferred embodiment 228A of the third eigenvalue decomposition and calculation portion 228 of FIG. 16 according to the present invention, which performs the embodiment 208A of FIG. 18. The embodiment 228A of the third eigenvalue decomposition and calculation portion 228 includes a third eigenvalue decomposer 252, a power allocation portion 254, and a third selector 256.

After Step 206 of FIG. 15, the third eigenvalue decomposer 252 generates B B instantaneous eigenvectors $Q_0$ and B B instantaneous eigenvalues $\Lambda_0$ from the autocorrelation matrix R' input from the second multiplication portion 226 by the above-described EVD method and outputs the generated B B instantaneous eigenvectors $Q_0$ to the third selector 256 and the generated B B instantaneous eigenvalues $\Lambda_0$, to the power allocation portion 254 in Step 240.

In Step 242 of FIG. 18, the power allocation portion 254 generates the number of basis vectors, N, and the gain values $P^{1/2}$ from the instantaneous eigenvalues $\Lambda_0$ input from the third eigenvalue decomposer 252 and outputs the generated number of basis vectors, N, to the third selector 256 and the generated gain values $P^{1/2}$ to the gain adjustment unit 184. In particular, the power allocation portion 254 obtains a power allocation ratio for channels using the instantaneous eigenvalues $\Lambda_0$, allocates the total power given to the base station 10 among the channels using the obtained power allocation ratio, and determines the allocated results as the gain values $P^{1/2}$. Here, the power allocation portion 254 may calculate the power allocation ratio and the number of basis vectors, N, from the instantaneous eigenvalues $\Lambda_0$ by a water filtering or inverse water filtering method. The water filtering method is disclosed in "Digital Baseband Transmission and Recording", Jan W. M. Bergmans, Kluwer Academic Press, Boston, 1996. The inverse water filtering method is disclosed in a Stanford University doctorial dissertation entitled "Linear precoding and decoding for multiple input multiple output (MIMO) wireless channels" by Hemanth Sampath, April, 2001.

After Step 242, the third selector 256 selects instantaneous eigenvectors in a quantity equal to the number of basis vectors, N, input from the power allocation portion 256, from among the instantaneous eigenvectors $Q_0$ input from the third eigenvalue decomposer 252 and outputs column vectors which consist of the selected N instantaneous eigenvectors, as the effective instantaneous eigenvectors, i.e., the basis vectors Q, to the basis vector application unit 186 in Step 244. Here, the size of the column vectors is N.

After Step 172 of FIG. 13, the gain adjustment unit 184 adjusts the amplitudes of the DPCH signals according to the N gain values $P^{1/2}$ input from the basis information generation unit 182 and outputs the amplitude-adjusted DPCH signals to the basis vector application unit 186 in Step 174.

Hereinafter, an embodiment of Step 174 of FIG. 13 according to the present invention will be described with reference to the appended drawings.

Figure 20:
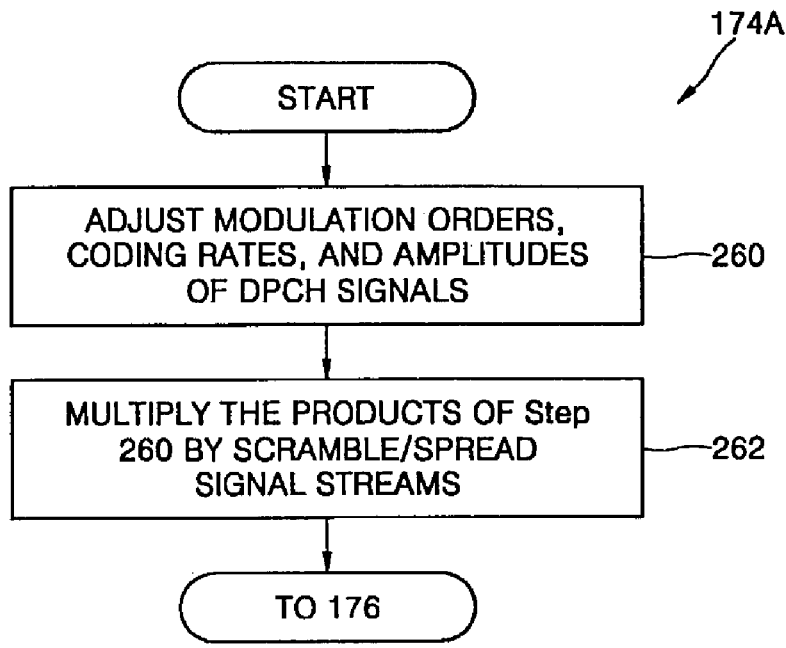
FIG. 20 is a flowchart illustrating an embodiment of Step 174 of FIG. 13 according to the present invention.

FIG. 20 is a flowchart illustrating an embodiment 174A of Step 174 of FIG. 13 according to the present invention. The embodiment 174A involves adjusting modulation orders, coding rates, and amplitudes of the DPCH signals (Step 260), and spreading and scrambling the DPCH signals having the adjusted results (Step 262). Referring to FIG. 20, after Step 172, the modulation orders, coding rates, and amplitudes of the DPCH signals are adjusted in Step 260.

Hereinafter, embodiments of Step 260 of FIG. 20 and the gain adjustment unit 184 of FIG. 14 according to the present invention will be described with reference to the appended drawings.

Figure 21:
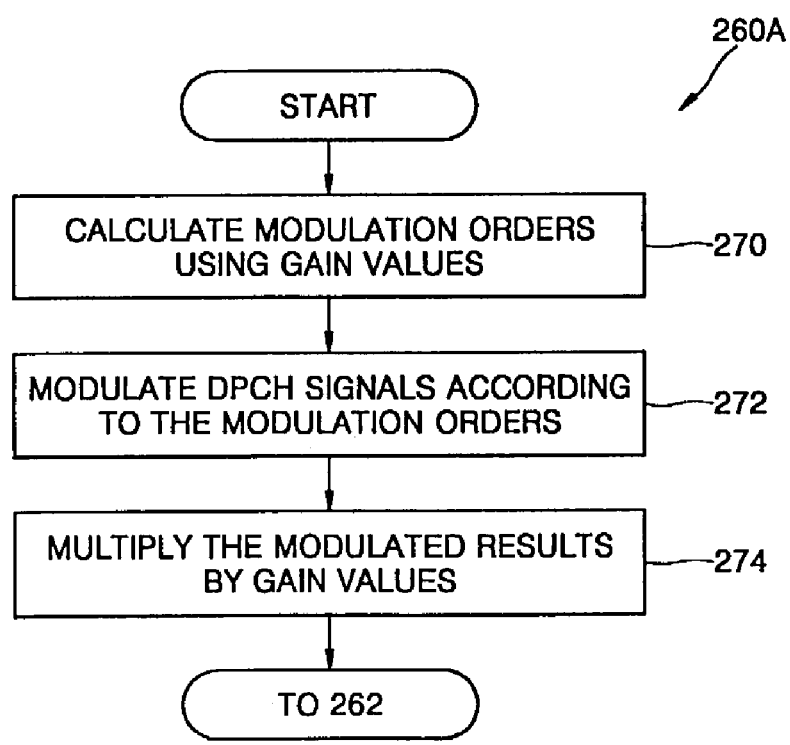
FIG. 21 is a flowchart illustrating an embodiment of Step 260 of FIG. 20 according to the present invention.

FIG. 21 is a flowchart illustrating an embodiment 260A of Step 260 of FIG. 20. The embodiment 260A involves multiplying DPCH signals modulated with the modulation orders calculated using the gain values, by the gain values (Steps 270 through 274).

Figure 22:
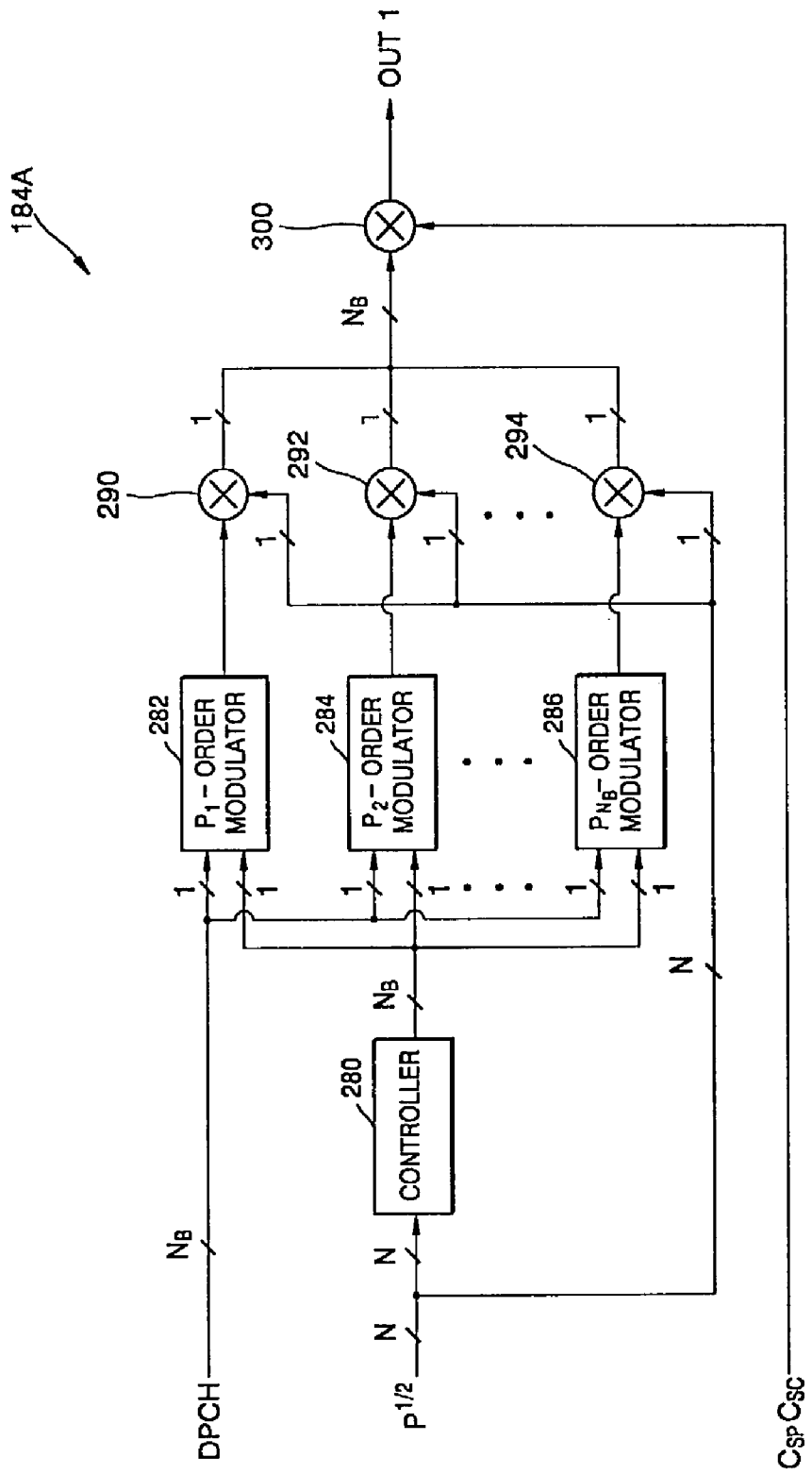
FIG. 22 is a block diagram illustrating a preferred embodiment of a gain adjustment unit of FIG. 14 according to the present invention.

FIG. 22 is a block diagram illustrating a preferred embodiment 184A of the gain adjustment unit 184 of FIG. 14. The embodiment 184A of the gain adjustment unit 184 includes a controller 280, $P_1$-order, $P_2$-order, . . . , and $P_{N_B}$-order modulators 282, 284, and 286, first, second, . . . , and $N_B^{th}$ multipliers 290, 292, . . . , and 294, and a $(N_B+1)^{th}$ multiplier 300.

After Step 172, the controller 280 calculates the modulation orders for the $P_1$-order, $P_2$-order, . . . , and $P_{N_B}$-order modulators 282, 284, . . . , and 286 using the gain values $P^{1/2}$ input from the basis information generation unit 182 by linear proportion and outputs the calculated modulation orders to the respective $P_1$-order, $P_2$-order, . . . , and $P_{N_B}$-order modulators 282, 284, . . . , and 286 in Step 270. The controller 280 checks for the quantity of power allocated to each channel using the gain values $P^{1/2}$ and determines the modulation order for each channel in proportional to the quantity of power allocated to each channel. The controller 280 assigns the largest modulation order to the channel to which the greatest power is allocated and the lowest modulation order to the channel to which the lowest power is allocated.

In Step 272, $P_1$-order, $P_2$-order, . . . , and $P_{N_B}$-order modulators 282, 284, . . . , and 286 perform $P_1$-order, $P_2$-order, . . . , and $P_{N_B}$-order quadrature amplitude modulation (QAM) on the DPCH signals according to the modulation orders input from the controller 280 and output the modulated results to the respective first, second, . . . , and $N_B^{th}$ multipliers 290, 292, . . . , and 294. Alternatively, the $P_1$-order, $P_2$-order, . . . , and $P_{N_B}$-order modulators 282, 284, . . . , and 286 may modulate the DPCH signals by an adaptive modulation and coding (AMC) method. The AMC method is disclosed in an article entitled "Variable-Rate Variable-Power MQAM for Fading Channels", IEEE Trans. On communications Vol. 45, No. 10, October, 1997, by A. Goldsmith and S. Chua., October, 1997.

In Step 274, the first, second, . . . , and $N_B^{th}$ multipliers 290, 292, . . . , and 294 multiply the modulated results output from the respective $P_1$-order, $P_2$-order, . . . , and $P_{N_B}$-order modulators 282, 284, . . . , and 286 by the gain values $P^{1/2}$ and output the products to the $(N_B+1)^{th}$ multiplier 300.

The controller 280, the $P_1$-order, $P_2$-order, . . . , and $P_{N_B}$-order modulators 282, 284, . . . , and 286, and the first, second, . . . , and $N_B^{th}$ multipliers 290, 292, . . . , and 294 perform Step 260 of FIG. 20 or Step 260A of FIG. 21.

Referring to FIG. 20, after Step 260, the $(N_B+1)^{th}$ multiplier 300 multiplies the products output from the first, second, . . . , and $N_B^{th}$ multipliers 290, 292, . . . , and 294 by scramble/spread signal streams and outputs the products as the DPCH signals having adjusted amplitudes via an output port OUT1 to the basis vector application unit 186 in Step 262. Here, scramble/spread signal streams, expressed as $C_{SP}C_{SC}$, refer to the products of multiplying scramble signal streams $C_{SC}$ by spread signal streams $C_{SP}$. Although the scramble/spread signal streams are illustrated as being previously stored in the gain adjustment unit 184 of FIG. 14, alternatively, the scramble/spread signal streams may be externally input.

According to the present invention, in the gain adjustment unit 184A of FIG. 22, the $(N_B+1)^{th}$ multiplier 300 may be optional. When Step 262 is omitted, i.e., when the gain adjustment unit 184A does not include the $(N_B+1)^{th}$ multiplier 300, the products of the multiplication by the first, second, . . . , and $N_B^{th}$ multipliers 290, 292, . . . , and 294 are output to the basis vector application unit 186 as the DPCH signals having adjusted amplitudes.

After Step 174 of FIG. 13, the basis vector application unit 186 applies the basis vectors Q input from the basis information generation unit 182 to the amplitude-adjusted DPCH signals input from the gain adjustment unit 184 and outputs the results to the addition unit 188 as spatially processed DPCH signals in Step 176.

Figure 23:
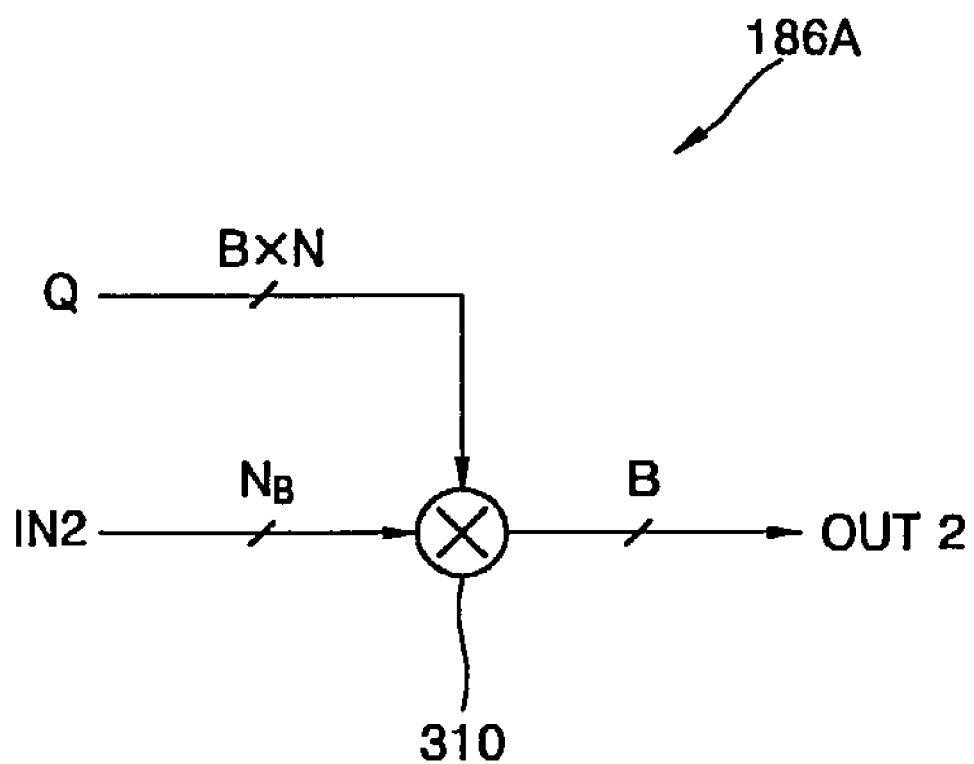
FIG. 23 is a block diagram illustrating an embodiment of a basis vector application unit of FIG. 14 according to the present invention.

FIG. 23 is a block diagram illustrating an embodiment 186A of the basis vector application unit 186 of FIG. 14 according to the present invention. The embodiment 186A of the basis vector application unit 186 includes a $(N_B+2)^{th}$ multiplier 310. To perform Step 176, the $(N_B+2)^{th}$ multiplier 310 of the basis vector application unit 186A multiplies the $N_B$ DPCH signals i having the adjusted amplitudes input via an input port IN2 from the gain adjustment unit 184 by the basis vectors Q input from the basis information generation unit 182, as expressed in equation 15 below, and outputs the products via the output port OUT2 to the addition unit 188 as the spatially processed DPCH signals o:

$$o=Qi \qquad (15)$$

where o and i are expressed as equations 16 and 17, respectively, below.

$$o=[o_1\ o_2 \ldots o_B] \qquad (16)$$

$$i=[i_1\ i_2 \ldots i_N] \qquad (17)$$

After Step 176, the addition unit 188 adds PICH signals $P_1(k), P_2(k), P_3(k), \ldots,$ and $P_B(k)$ input via an input port IN1 to the spatially processed DPCH signals input from the basis vector application unit 186 and transmits the added results via the antenna array 190 including transmission antennas to the first mobile station 20, the second mobile station 22, ..., or the $X^{th}$ mobile station 24 in Step 178. To perform Step 178, the addition unit 188 may include B adders (not shown). Here, the adders add the corresponding PICH signals $P_1(k), P_2(k), P_3(k), \ldots,$ and $P_B(k)$ to the spatially processed DPCH signals input from the basis vector application unit 186, respectively, and output the added results to the respective transmission antennas 192, 194, ..., and 196 of the antenna array 190. The transmission antennas 192, 194, ..., and 196 transmit the added results by the corresponding adders (not shown) of the addition unit 188 to the corresponding mobile stations 20, 22, ..., and 24.

The embodiments of the base station 10 of FIG. 1 and Step 32 are not limited to the above-described embodiments of the mobile station 10 and Step 30 and can be applied to any mobile station capable of generating long-term information and short-term information and converting them into a feedback signal and capable of transmitting the feedback signal to the base station 10, as described above.

As described above, in a mobile communication apparatus including multiple transmission and reception antennas and a mobile communication method performed in the apparatus according to the present invention, long-term information and short-term information reflecting a spatial-channel downlink characteristic are fed back from a mobile station to a base station, wherein only effective short-term eigenvectors, excluding effective short-term eigenvalues, are fed back as the short-term information. Therefore, with the great advantage of closed communications systems, the effects of interference, noise, and fading can be minimized, whereas throughput can be maximized.

While the present invention has been particularly shown and described with reference to preferred embodiments thereof, it will be understood by those of ordinary skill in the art that various changes in form and details may be made therein without departing from the spirit and scope of the present invention as defined by the appended claims.

What is claimed is:

1. A mobile station with at least one reception antenna, the mobile station comprising:
 a channel characteristic determination unit for determining a first characteristic from Pilot Channel (PICH) signals transmitted from a base station, and a channel downlink characteristic for each of at least one transmission antenna of the base station and the at least one reception antenna using the first characteristic;
 a long-term information determination unit which determines long-term information having effective long-term eigenvectors and effective long-term eigenvalues using the determined channel downlink characteristic;
 a short-term information determination unit for determining short-term information having effective short-term eigenvectors using the determined channeled downlink characteristic;
 a downlink power control unit for obtaining downlink power control information including a Signal to Interference and Noise Radio (SINR) which reflects the fist characteristic, using the determined channel downlink characteristic; and
 a signal conversion unit for combining the determined long-term information, short-term information, and downlink power control information into a feedback signal to be transmitted to the base station;
 wherein the mobile station is not arranged to transmit eigenvalues corresponding to effective short-term eigenvectors to the base station as part of the feedback signal.

2. The mobile station of claim 1, further comprising a signal restoration unit for restoring Dedicated Physical Channel (DPCH) signals transmitted from the base station.

3. The mobile station of claim 1, wherein the long-term information determination unit comprises:
 an accumulation portion for accumulating the channel downlink characteristic to obtain a long-term correlation of the channel downlink characteristic; and
 a first eigenvalue decomposition and calculation portion for generating the effective long-term eigenvectors and the effective long-term eigenvalues from the long-term correlation of the channel of the channel downlink characteristic.

4. The mobile station of claim 3, wherein the first eigenvalue decomposition and calculation portion comprises:
 a first eigenvalue decomposer for generating long-term eigenvectors and long-term eigenvalues using the long-term correlation of the channel downlink characteristic;
 a vector counter for counting a number of long-term eigenvalues which are greater than a first predetermined threshold value, and outputting the counted result as a number of effective long-term eigenvectors; and
 a first selector for selecting long-term eigenvectors from which noises have been removed, in a quantity equal to the number of transmission antennas from among the long-term eigenvectors input from the first eigenvalue decomposer, selecting long-term eigenvalues from which noises have been removed, in a quantity equal to the number of effective long-term eigenvectors from among the long-term eigenvalues input from the first eigenvalue decomposer, as the effective long-term eigenvectors and the effective long-term eigenvalues, respectively,
 wherein the first predetermined threshold value is a noise level in the long-term correlation of the channel downlink characteristic.

5. The mobile station of claim 1, wherein the short-time information determination unit comprises:
- a short-term correlation determination portion for obtaining a short-term correlation of the channel downlink characteristic for each of the transmission and reception antennas; and
- a second eigenvalue decomposition and calculation portion for generating the effective short-term eigenvectors from the obtained short-term correlation of the channel downlink characteristic.

6. The mobile station of claim 1, wherein the downlink power control unit comprises:
- a subtraction portion for subtracting a second predetermined threshold value from the SINR; and
- a sign checking portion for determining the downlink power control information based on the sign of the subtracted result.

7. A base station with at least one reception antenna, the base station comprising:
- an information restoration unit for restoring long-term information, short-term eigenvectors, and a Signal to Interference and Noise Ratio effective (SINR) from a feedback signal transmitted from a mobile station;
- a basis information generating unit for generating basis vectors and gain values as basis information from the restored long-term information, the restored effective short-term eigenvectors, and the restored SINR;
- a gain adjustment unit for adjusting amplitudes of Dedicated Physical Channel (DPCH) signals according to the gain values, and outputting the adjusted results;
- a basis vector application unit for applying the basis vectors to the adjusted results input from the gain adjustment unit, and outputting the applied results as the spatially processed results; and
- an addition unit for adding Pilot Channel (PICH) signals to the spatially adjusted results to be transmitted to the mobile station;
- wherein the base station is not arranged to receive eigenvalues corresponding to the effective short-term eigenvectors from the mobile station as part of the feedback signal.

8. The base station of claim 7, wherein the basis information generation unit comprises:
- a basis vector interpolation portion for interpolating the restored effective short-term eigenvectors;
- a basis value generation portion for determining effective short-term eigenvalues using a table obtained from the restored SINR and a number of effective long-term eigenvectors;
- a first multiplication portion from multiplying the restored long-term information, the result of the interpolation performed using the effective short-term eigenvectors, and the generated effective short-term eigenvalues;
- a second multiplication portion for calculating an autocorrelation matrix using the multiplied result; and
- a third eigenvalue decomposition and calculation portion for generating the basis vectors and the gain values using the autocorrelation matrix.

9. The base station of claim 8, wherein the third eigenvalue decomposition and calculation portion comprises:
- a third eigenvalue decomposer for generating instantaneous eigenvectors and instantaneous eigenvalues from the autocorrelation matrix;
- a power allocation portion for generating a number of the basis vectors and the gain values from the instantaneous eigenvalues; and
- a third selectors for selecting instantaneous eigenvectors in a quantity equal to the number of basis vectors input from the power allocation portion, from among the instantaneous eigenvectors and outputting column vectors which consist of the selected instantaneous eigenvectors, as the basis vectors.

10. The base station of claim 9, wherein the power allocation portion calculates a power allocation ratio for channels and a number of the basis vectors from the instantaneous eigenvalues allocates a total power given to the base station among the channels using the power allocation ratio, and determines the allocated results as the gain values.

11. A mobile communication method performed in a base station with at least one transmission antenna, the method comprising the steps of:
- (a1) restoring long-term information, effective short-term eigenvectors, and a Signal to Interference and Noise Ratio (SINR) from a feedback signal transmitted from a mobile station;
- (a2) generating basis vectors and basis values as basis information from the restored long-term information, the restored effective short-term eigenvectors, and the restored SINR;
- (a3) adjusting amplitudes of Dedicated Physical Channel (DPCH) signals using gain values;
- (a4) applying the basis vectors to the amplitude-adjusted DPCH signals and determining the results as the spatially processed results; and
- (a5) adding Pilot Channel (PICH) signals to the spatially processed results and transmitting the added results via the at least one transmission antenna to the mobile station;
- wherein the mobile station is not arranged to transmit eigenvalues corresponding to the effective short-term eigenvectors to the base station as part of the feedback signal.

12. The mobile communication method of claim 11, wherein step (a2) comprises the steps of:
- (a21) interpolating the restored effective short-term eigenvectors;
- (a22) determining effective short-term eigenvalues using a table obtained from the restored SINR and a number of the effective long-term eigenvectors, $N_B$;
- (a23) multiplying the restored long-term information, the results of the interpolation performed using the effective short-term eigenvectors, and the effective short-term eigenvalues to obtain a reception channel characteristic matrix;
- (a24) calculating an autocorrelation matrix from the reception channel characteristic matrix; and
- (a25) generating the basis vectors and the gain values from the autocorrelation matrix.

13. The mobile communication method of claim 12, wherein step (a25) comprises:
- generating instantaneous eigenvectors and instantaneous eigenvalues from the autocorrelation matrix by an eigenvalue decomposition method;
- generating the number of basis vectors, N, and the gain values from the instantaneous eigenvectors; and
- selecting instantaneous eigenvectors in a quantity equal to the number of basis vectors, N, from among the generated instantaneous eigenvectors, and determining the selected N instantaneous eigenvectors as the basis vectors.

14. The mobile communication method of claim 11, wherein step (a3) comprises (a31) adjusting modulation orders, coding rates, and the amplitudes of the DPCH signals using the gain values.

15. The mobile communication method of claim 14, wherein step (a3) further comprises (a32) multiplying the adjusted results in step (a31) by scramble/spread signal streams, and determining the products as DPCH signals having adjusted amplitudes.

16. The mobile communication method of claim 14, wherein step (a31) further comprising:
obtaining the modulation orders using the gain values by linear proportion;
modulating the DPCH signals according to the modulation orders; and
multiplying the modulated results by the gain values.

17. The mobile communication method of claim 11, wherein step (a4) comprises multiplying the DPCH signals having adjusted amplitudes obtained in step (a3) by the basis vectors, and determining the products as the spatially processed results.

18. A mobile communication method performed in a mobile station with at least one reception antenna, the method comprising: between a base station with
(b1) determining the first characteristic from pilot channel (PICH) signals transmitted from a base station, and a channel downlink characteristic for each of at least one transmission antenna of the base station and the at least one reception antenna using the first characteristic;
(b2) determining long-term information having effective long-term eigenvectors and effective long-term eigenvalues using the determined channel downlink characteristic;
(b3) determining short-term information having effective short-term eigenvectors using the determined channel downlink characteristic;
(b4) obtaining downlink power control information including a Signal to Interference and Noise Ratio (SINR) which reflects the first characteristic, using the determined channel downlink characteristic; and
(b5) combining the determined long-term information, short-term information, and downlink power control information into a feedback signal to be transmitted to the base station;
wherein the base station is not arranged to receive eigenvalues corresponding to effective short-term eigenvectors from the mobile station as part of the feedback signal.

19. The mobile communication method of claim 18, wherein step (b4) comprises:

subtracting a second predetermined threshold value from the SINR; and
determining the downlink power control information based on the sign of the subtracted result.

20. The mobile communication method of claim 18, further comprising restoring the PICH signals from the spatially processed results received via the at least one reception antenna.

21. The mobile communication method of claim 18, wherein step (b2) comprises:
(b21) accumulating the channel downlink characteristic to obtain a long-term correlation of the channel downlink characteristic for each of the transmission and reception antennas; and
(b22) generating the effective long-term eigenvectors and the effective long-term eigenvalues from the accumulated channel downlink characteristic.

22. The mobile communication method of claim 21, wherein step (b22) comprises:
generating long-term eigenvectors and long-term eigenvalues from the long-term correlation of the channel downlink characteristic;
counting a number of the long-term eigenvalues which are greated than a first predetermined threshold value and determining the counted result as a number of effective long-term eigenvectors; and
selecting long-term eigenvectors from which noises have been removed, in a quantity equal to a number of transmission antennas from among the generated long-term eigenvectors, selecting long-term eigenvalues from which noises have been removed, in a quantity equal to the number of effective long-term eigenvectors from among the generated long-term eigenvalues, and outputting the selected long-term eigenvectors and long-term eigenvalues as the effective long-term eigenvectors and the effective long-term eigenvalues, respectively,
wherein the first predetermined threshold value is a noise level in the long-term correlation of the channel downlink characteristic.

23. The mobile communication method of claim 18, wherein step (b3) comprises:
(b31) generating a short-term correlation of the channel downlink characteristic for each of the transmission and reception antennas; and
(b32) generating the effective short-term eigenvectors from the short-term correlation of the channel downlink characteristic.

* * * * *